(12) United States Patent
McConell

(10) Patent No.: US 12,493,858 B2
(45) Date of Patent: Dec. 9, 2025

(54) WASTE MANAGEMENT AND PROCESSING SYSTEM

(71) Applicant: RYW HOLDINGS PTY LTD, Suffolk Park (AU)

(72) Inventor: Luke McConell, Suffolk Park (AU)

(73) Assignee: RYW HOLDINGS PTY LTD, Suffolk Park (AU)

( * ) Notice: Subject to any disclaimer, the term of this patent is extended or adjusted under 35 U.S.C. 154(b) by 932 days.

(21) Appl. No.: 17/637,327

(22) PCT Filed: Aug. 21, 2020

(86) PCT No.: PCT/AU2020/050883
§ 371 (c)(1),
(2) Date: Feb. 22, 2022

(87) PCT Pub. No.: WO2021/030879
PCT Pub. Date: Feb. 25, 2021

(65) Prior Publication Data
US 2022/0274895 A1 Sep. 1, 2022

(30) Foreign Application Priority Data
Aug. 22, 2019 (AU) ................................ 2019903072

(51) Int. Cl.
*G06Q 10/30* (2023.01)
*A61L 11/00* (2006.01)
(Continued)

(52) U.S. Cl.
CPC .............. *G06Q 10/30* (2013.01); *A61L 11/00* (2013.01); *B09B 3/32* (2022.01); *B09B 3/35* (2022.01);
(Continued)

(58) Field of Classification Search
CPC ........... G06Q 10/30; A61L 11/00; B09B 3/60; B09B 3/00; B09B 2101/70; C05F 7/005;
(Continued)

(56) References Cited

U.S. PATENT DOCUMENTS 5,441,552 A 8/1995 Delillo
6,767,381 B2 7/2004 Huhn
(Continued)

FOREIGN PATENT DOCUMENTS

AU 2003208132 A1 1/2004
DE 29609734 U1 8/1996
(Continued)

OTHER PUBLICATIONS

"Operational Manual on Composting for an Integrated Resource Recovery Center", Book, Mar. 2012, p. 1-72, United Nations Economic and Social Commission for Asia and the Pacific.
(Continued)

*Primary Examiner* — Jacob S. Scott
*Assistant Examiner* — Miraj T. Patel
(74) *Attorney, Agent, or Firm* — Hayes Soloway P.C.

(57) ABSTRACT

A system of waste management and compost generation comprising: a waste collection system wherein waste is collected in separated compostable and non compostable waste streams from at least one source in trackable bins; and wherein the trackable bins contain separated compostable and non compostable waste streams from at least one source; a processing facility which receives and processes the compostable and non compostable waste in the trackable bins; a sorting system for further processing the waste from the trackable bins into a compostable stream and a non compostable stream; a communication and data entry system for collecting the data from the sorting system and reporting the data to at least one source; a composting system which
(Continued)

processes the compostable stream into compost material; and a processing system that processes or bundles a high percentage of the non compostable stream into useful products.

17 Claims, 14 Drawing Sheets

(51) Int. Cl.
    *B09B 3/32* (2022.01)
    *B09B 3/35* (2022.01)
    *B09B 3/60* (2022.01)
    *C05F 7/00* (2006.01)
    *C05F 9/02* (2006.01)
    *C05F 17/40* (2020.01)
    *C05F 17/60* (2020.01)
    *C05F 17/80* (2020.01)
    *C05F 17/907* (2020.01)

(52) U.S. Cl.
    CPC ............... *B09B 3/60* (2022.01); *C05F 7/005* (2013.01); *C05F 9/02* (2013.01); *C05F 17/40* (2020.01); *C05F 17/60* (2020.01); *C05F 17/80* (2020.01); *C05F 17/907* (2020.01)

(58) Field of Classification Search
    CPC .. C05F 9/02; C05F 17/40; C05F 17/60; C05F 17/80; C05F 17/907; C05F 17/20; C05F 17/943; C05F 17/90; Y02E 50/30; Y02W 90/00; G01G 19/40; G06V 2201/06
    See application file for complete search history.

(56) References Cited

U.S. PATENT DOCUMENTS

| 7,144,550 | B2 | 12/2006 | Devine |
| 9,624,439 | B2 | 4/2017 | Bakaya |
| 2013/0297518 | A1 | 11/2013 | Nassar et al. |
| 2014/0045234 | A1 | 2/2014 | Burke et al. |
| 2017/0178066 | A1 | 6/2017 | High et al. |
| 2018/0268379 | A1 | 9/2018 | Collins et al. |
| 2018/0376357 | A1 | 12/2018 | Tavares Coutinho et al. |
| 2021/0114950 | A1* | 4/2021 | Krivov ............... C02F 3/34 |

FOREIGN PATENT DOCUMENTS

| DE | 29706411 U1 | 5/1997 |
| GB | 2431923 A | 5/2007 |
| WO | 2002016288 A1 | 2/2002 |
| WO | 2005/063946 A1 | 7/2005 |
| WO | 2008056146 A2 | 5/2008 |
| WO | 2009137458 A2 | 11/2009 |
| WO | 2015/199888 A2 | 12/2015 |

OTHER PUBLICATIONS

Maria Vela-Cano, "Effect of Heavy Metals on the Growth of Bacteria Isolated from Sewage Sludge Compost Tea", Journal, 2014, 644-655, vol. 4, Advances in Microbiology.

* cited by examiner

WASTE MANAGEMENT AND PROCESSING SYSTEM

CROSS-REFERENCE TO RELATED APPLICATIONS AND PRIORITY

This patent application claims priority from PCT Patent Application No. PCT/AU2020/050883 filed Aug. 21, 2020, which claims priority from Australian Patent Application No. 2019903072 filed Aug. 22, 2019. Each of these patent applications are herein incorporated by reference in their entirety.

TECHNICAL FIELD

The present invention relates to a waste management and processing system and, more particularly although not exclusively include aspects of a waste data collection, management, education and reporting system which allows complete separation and decontamination of organic (compostable) and non organic (non compostable) waste streams. Even more particularly it relates to a compostable waste processing system, although not exclusively, adapted to provide targeted compost in controlled small batches (to provide a valuable solution to the waste problem). The overriding goal of the system is to sort waste streams from a single source (the producer of the waste) into pure, decontaminated streams, prior to the mixing and compacting of such waste streams with waste from other sources. The "pure" waste streams resulting from this process allow for the production of valuable decontaminated organic and non organic products.

BACKGROUND

Waste Management and Recycling

Currently the majority of domestic and commercial waste streams are disposed of by lifting bins directly into a compactor collection truck.

A majority of this waste is contaminated by the mixing of compostable waste, such as food and garden waste, with other waste stream types such as packaging waste (plastics, glass, metals, cardboard etc). This holds true even when separate bins are provided (organics, recycling, and/or general rubbish) because the majority of commercial businesses and households do not separate waste correctly. Systems based on "amateur" sorting of rubbish inevitably face problems with cross-contamination of food and garden waste with packaging waste.

While waste in general contains valuable resources if separated, it is generally of too low a value to be viably transported in an uncompacted state. Therefore, compactor trucks are used almost universally in waste collection services. However, once contaminated (mixed food and packaging) waste enters a compactor truck it becomes near-impossible to decontaminate the individual food and packaging waste streams at a later date. The consequences of this are:

1) Materials Recovery Facilities (MRF's) contain large and sophisticated technology to attempt to separate cross-contaminated waste. They are expensive to operate and are generally located far from residential and metropolitan areas which adds to transportation costs,
2) While MRF's are partially successful in separating waste, the outputs remain partially contaminated and are usually suitable for recycling into products of equal or lower value. Enormous volumes of both organic (compostable) waste and other recyclable waste streams such as packaging materials waste are too contaminated to process and taken to landfill, or a waste-to-energy facility for incineration.

The mixing and compacting of waste in compactor trucks also means that accurate data cannot be collected from individual commercial business or households ('at source'). Loss of data at source eliminates any chance of building an accurate data acquisition and reporting system into the waste collection system. Ad hoc attempts are occasionally made to inspect the contents of bins, or fine those who place the wrong items in the wrong bin, but these approaches have proven ineffective, and the problem of cross-contamination continues unabated.

These typical waste collection methods produce considerable carbon emissions during the transportation phase and significant greenhouse gas emission in the form of methane from the landfill site. Methane is generated when compostable matter such as food waste breaks down with non-putrescible waste material waste in a landfill environment in a process known as anaerobic decomposition.

As community awareness and concern over the degradation of the environment grows, there is increasing dissatisfaction and pressure for alternative solutions to the disposal of waste in landfill.

Apart from the environmental damage caused by this form of waste management, there is a significant economic loss associated with the permanent burial of undifferentiated waste in landfill, including the loss of recyclable materials and the cost of replacing them with virgin materials, as well as the costs involved in transporting large volumes of waste over large distances, operating and maintaining landfill facilities, and building new landfill sites as existing landfill sites reach capacity.

Aim/Goal

The aim of the present invention is to separate compostable waste streams from noncompostable waste streams prior to compaction so that all waste material can be processed and recycled into useful products. The process as claimed in claim 1 leads to higher levels of purity in the sorted waste streams, meaning that the outputs of the system are able to be reused or up-cycled into similar or higher value goods. This is particularly important with plastics and food waste.

Offensive odour and leachate leaking from raw compostable waste into the local environment, and attraction of vermin and birds to raw compostable waste, such as food waste, is a common problem within commercial centres and waste dumps. In a preferred arrangement, the system of the invention is based on a novel small, hygienic pre-processing module (decontamination module) which operates in a controlled environment, eliminating odour, leachate or mess, allowing it to be located close to the source of the waste in a way which improves hygiene and customer satisfaction. This resolves the issues related to compacting mixed waste streams in order to viably transport to material recovery facilities or landfill sites.

Transport logistics are a significant problem in waste management. Compactor and other collection trucks are large, noisy and expensive to operate and prone to creating traffic and access issues. The system of the present invention allows for flexibility in deploying decontamination and processing equipment in various configurations which can be optimised according to the type, volume and location of waste streams. This flexibility is illustrated in FIG. 7, which show two potential configurations of the system. The first configuration would be suited to a small town, island or remote community. In this example, a central facility is able to be located close to all waste sources. Trackable bins are transported directly to the facility which conducts all operations of the system. The second example (FIG. 7B) is suited to a city. In this deployment of the system, sorting, decontamination, data collection/reporting and consolidation are conducted in a number of decontamination modules, each located close to the source of the waste and processing a given volume of waste into pure compacted waste streams, then sending all to a facility where composting, recycling and re-use operations are conducted. Other configurations can be adjusted to the needs of customers, available space, and proximity to agricultural or industrial areas where the re-used/recycled products can be sold.

The invention then uses the collected compostable waste to generate aerobic compost (including compost tailored to particular types of plants by inoculation of biological matter), and other useable materials in an industrial environment.

The further aim of the system is to collect data on cross-contamination of compostable and on compostable waste streams on a 'per Customer' basis and provide ongoing feedback via accurate data to the customer and other parties to improve waste separation in an ongoing fashion. The system is capable of providing photos/videos of each individual contamination event (for example, food left in recyclable containers, or plastics such as plastic wrap left in the "organics/compostable waste" bin). This allows for differential pricing, but more significantly pinpoints contamination events and facilitates communication and improved practices. The success of the system is greatly enhanced by this consistent, detailed feedback and communication.

To summarise, the system of the invention allows for "professional" decontamination of waste close to the source. This solves the problem of "amateur" separation of waste and the problems it creates once this waste is compacted and/or transported to a centralised facility. This in turn allows "pure" waste streams to be converted back into high value resources.

Separation Systems

Systems which at least separate compostable food and garden waste from solid, non compostable waste materials are known. Nevertheless, in many cases there remains a level of contamination of plastics and other non-compostable material in the compostable waste stream, as well as compostable material in the non-compostable waste stream, resulting in environmental issues as well as difficulty of processing and loss of potential revenue.

A lack of reporting back to the individual 'source' business or household means that contamination levels remain, and a scalable education system to improve the result is not currently available.

Separation Systems in Centralised Facilities

There are multiple technologies designed to separate and extract recyclable materials after they have been compacted and/or transported to a central facility. These technologies attempt to separate cross-contaminated recycling into useful streams using technologies including infrared and optical sensor, compressed air jets, magnetic fields, and kilometres of conveyor belts. These systems clearly have their place in the waste stream 'food chain'. However, the technologies used in these systems are only necessary to reverse the problems which are created by the collection, compacting and transporting waste to a large, centralised facility.

Tracking of Waste Back to Source

Systems are known which identify the individual source of the waste by providing tagging or tracking devices on garbage bags. However these systems rely on the customer placing the correct item in the bag and do not confirm whether the bags have been correctly filled. They also create extra work for the customer, and use extra plastic bags. Such a system is disclosed for example in AU 2003208132 A1 to Worley Pty Ltd.

Similarly, 'Container Deposit' systems allow customers to claim credits for disposing of certain items in 'vending machine' type units which accept certain types of recyclable packaging. However, such systems require that each item be entered individually.

Data Collection, Reporting and Education

Systems for collection of waste data are known but are usually associated with the weight measurement of an individual bin only, or entire truck load only, with minimal data being collected around individual waste stream types associated within each individual bin sourced from individual commercial businesses or households. This results in poor consumer education around cross-contamination of compostable and non compostable waste streams, and therefore low recycling results. There is no system which generates reports on contamination back to source, much less a system which is capable of pinpointing each contamination event and reporting it back to the consumer to create behavioural change. FIG. 13 shows an example of a waste analysis and reporting system.

Some waste data collection methods are known for individual commercial businesses and households that are based on basic 'visual' observation of waste streams in individual bins.

Some basic methods are known that educate individual commercial businesses on correct packaging streams to use, in order to reduce landfill.

In Summary

| Known Systems | Embodiments of Present Invention |
| --- | --- |
| Rely on 'amateur' (ie the customers sorting waste into recyclable, non-recyclable materials and organic materials. The badly sorted waste is then mixed with other customers' waste and transported to a central facility which attempts to cope with the major headaches caused by compacting and transporting cross-contaminated sorted waste, resulting in low quality outputs and low recycling rates, of typically less than 50%. | Sorts waste 'professionally' directly from a tracked bin in a small hygienic facility, allowing waste streams to be sorted and consolidated at source. This opens up a range of innovative downstream process based on the establishment of pure waste streams resulting in recycling rates of up to 95-100%, with the ability to process into high value products including activated biological compost produced via a unique batch processing system |

Composting System

Composting systems are widely used for agriculture and horticulture.

Composting systems that specialise in the processing of compostable waste, such as food waste produced by commercial business and households are typically processed outside, open to the natural environment, at licenced compostable processing facilities.

In the case of commercial treatment of compostable waste, this typically involves composting "en mass" in open air windrows, or in large piles turned by heavy diesel operated machinery. The resulting compost is generally of low quality because of the consistent exposure to the elements of rain, sun and plastics contamination.

Some other known composting methods employ bulk enclosed composting systems, such as 'tunnel composting' which use large amounts of electricity, and/or fuel, resulting in high CO2 emissions and a large carbon "footprint". Plastics contamination generally remains an issue in this composting method because of contamination at source.

Composting systems are known that are designed to process compostable waste, such as food waste produced by commercial business and households, in an enclosed environment to reduce the amount of leachate and odour that can potentially be an issue to the local environment.

One example of such composting system is disclosed in PCT/NZ01/00171 published on 28 Feb. 2002. This patent discloses a composting system which includes a stationary composting chamber with an inlet and outlet end of the chamber. The inside of the chamber contains a series of discrete arms which can be used to mix and agitate composting material placed in the inlet and transport the compost material to the outlet at the other end of the chamber while the material composts and biodegrades in the chamber. Air can be incorporated into the chamber and the temperature levels within the chamber can be controlled and monitored by the user via a microprocessor-based system. The contents of PCT/NZ01/00171 is incorporated herein by way of cross-reference in their entirety. Material that is expelled from outlet of the chamber is then typically placed in a large pile or windrows for further decomposition and storage.

An issue with both outdoor and 'in vessel' composting is the inability to produce a high quality product throughout the entirety of the mass of compost produced. This is related directly to the typical storage method of piles, or windrows being exposed to the elements such as sun and rain, which lowers the quality and consistency of the final compost product.

Objects of at least embodiments of the present invention include providing:
a) A method of sorting waste directly from tracked bins
b) A hygienic, odour-free unit (Decontamination Module) small enough to be located close to or within buildings which is capable of sorting waste into pure waste streams, and which allow for a flexible, decentralised approach to waste management.
c) A reporting system which reports specifically on contamination, to a high level of detail, in order to achieve pure streams for recycling into a useful product
d) A batch-composting process based around a system of 'aeration crates' which allows for inoculation and monitoring of high quality compost produced from uncontaminated compostable waste, in controlled batches.
e) A wastewater system which supports the above processes by greatly reducing the need for fresh water inputs and wastewater disposal while simultaneously providing an ideal growing medium for producing biological inoculant which is added within the composting process.

Each of these is an advance. Each inter-act in a highly efficient closed-loop system to solve the key issue of compostable waste being sent to landfill.

It is a further broad object of the present invention to address or at least ameliorate some of the above disadvantages of processing compostable waste such as food waste, or at least provide a useful alternative.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

Definitions

Compost— the term compost is used to describe decayed compostable material used as a fertiliser for plant growth.

Compostable— the term compostable is used to describe material made from a natural substance. It can be derived from living matter including fibres, cardboard, vegetable matter, plant matter, biological matter, food, green waste or plant-derived materials such as polylactic acid.

Non Compostable is used to describe materials that are not compostable. For example, non compostable materials may include plastics, metals, polymers, glass and various forms of packaging found in waste.

Biological inoculants are a nutrient and microbiologically enriched solution used in domestic and commercial agriculture and horticulture environments. Sometimes known as a 'compost tea', these solutions have a wide variety of uses including encouraging plant growth, suppressing plant diseases, provide beneficial organisms, and replace toxic garden chemicals. There are many ways to generate compost tea. For example, the solution can be produced by a small amount of compost steeped in water and can also be aerated for a period of time. The period of time can range from hours to days (e.g. 3 to 4 days) depending on the level of concentration desired in the compost tea. The tea can then be used to spray directly onto plants, or soil for fertilising purposes. A method of generating compost tea is disclosed in U.S. Pat. No. 6,767,381 B2.

Compost tea is a solution usually consisting of a small part of compost to large parts of water (un-chlorinated) and used for boosting the number of diversity of microorganisms in the soil.

Inoculation is the act of introducing microorganisms into a culture medium.

Re-use/Reusable, Recycle/Recyclable—the terms Re-use/Reusable, Recycle/Recyclable are used interchangeably to describe that the material is used, or able to be used, in the manufacture of other useful products, with or without further processing.

Customer—the term Customer is used to describe food businesses, households, shopping centres, festivals and events and any other producers of waste which includes a mix of compostable waste and non-compostable waste.

SUMMARY OF INVENTION

According to a broad form of the invention there is provided a system of waste management and compost generation that comprises:
- a waste collection system wherein waste is collected in separated compostable and non compostable waste streams from at least one source in trackable bins; and wherein the trackable bins contain separated compostable and non compostable waste streams from at least one source;
- a processing facility which receives and processes the compostable and non compostable waste in the trackable bins;
- a sorting system for further processing the waste from the trackable bins into a compostable stream and a non compostable stream;
- a communication and data entry system for collecting the data from the sorting system and reporting the data to at least one source;
- a composting system which processes the compostable stream into compost material; and
- a processing system that processes or bundles a high percentage of the non compostable stream into useful products.

Preferably, the waste collection system comprises of the collection of waste from a source to a processing facility or facilities.

Preferably, the waste collected has been separated by a Customer into compostable and non compostable streams and placed into separate trackable bins.

Preferably, the waste in the trackable bin can be identified to individual sources.

Preferably, the data of the compostable and non-compostable streams is collected and reported to a source.

Preferably, the data collected on the quantity and type of materials placed in each trackable bin, the level of contamination within each trackable bin and other factors identified by the system is reported back to the Customer.

Preferably, the data is used to charge the Customer a differential fee.

Preferably, the data is collated to provide meta data on waste.

Preferably, some, or all of the non-compostable waste streams are decontaminated and then further processed into a recyclable stream.

Preferably, some, or all of the non-compostable waste streams are decontaminated and then further processed into a conversion stream.

Preferably, the recyclable stream is directed to a recycling facility.

Preferably, the conversion stream is directed to a conversion process to convert its contents to a usable material.

Preferably, the contents of the conversion stream are plastic materials which are converted to usable material such as diesel fuel or extruded plastics, molded plastics, 3D printing filaments and products, and/or a crude oil.

Preferably, decontamination, sorting, compaction and data collection occur in a decontamination module—a facility which by virtue of its size and hygienic processes is able to be positioned close enough to the source of the waste so as to receive waste without the use of large trucks, including compactor trucks.

Preferably, the decontamination, sorting, compaction and data collection occur in an decontamination module—a facility that is by virtue of its size and hygienic processes can be located within existing residential and commercial buildings so that trackable bins may be collected and returned 'by hand' or at least without the need for compactor trucks or long distance transport; whereby the system thus operates on a decentralised model whereby the decontamination, sorting, compaction and data collection occur in the decontamination module closer to the source of the waste and decontaminated 'clean' waste streams can be transported to larger, more distant facilities for reuse, recycling or upcycling into useful products.

Preferably, the decontamination module may be mobile or transportable.

Preferably, an algorithm is used to determine what equipment should be located close to the Customer so as to minimise transport of unseparated, uncompacted waste streams.

Preferably, the compostable stream is further processed.

According to another broad form of the invention there is provided a method of generating compost material that comprises the steps of,
- processing trackable bins filled with compostable waste received from a source;
- wherein the waste is collected in batches and transported to a processing location in said trackable bins;
- and wherein data is collected and reported to the source;
- and wherein the compostable stream is further processed into compost material; and
- the compost material is inoculated and transferred to an aeration volume for curing of compost material.

Preferably, processing of the compostable stream comprises of decontamination of non compostable waste from the compostable stream.

Preferably, processing of the compostable stream comprises of shredding of compostable waste.

Preferably, processing of the compostable stream comprises of dewatering of compostable waste.

Preferably, a bulking agent is added into the compostable waste.

Preferably, processing of the compostable waste comprises of anaerobic decomposition to create bioenergy, with digestate of the anaerobic process considered compostable waste and able to be aerobically treated to avoid landfill.

Preferably, the compostable waste is inoculated with a biological mixture.

Preferably, the compostable waste is transferred into a composting unit.

Preferably, the composting unit is an industrial composting unit.

Preferably, the composting unit comprises a composting chamber.

Preferably, the compostable material inside the composting chamber is mixed to facilitate biodegradation inside the chamber.

Preferably, the compostable material inside the composting chamber is agitated to facilitate biodegradation inside the chamber.

Preferably, temperature inside the composting chamber is adjusted to a desired level by the user.

Preferably, optimum temperature is 55° C. to 65° C., in order to achieve pasteurisation of the compostable material.

Preferably, pasteurised compostable material is inoculated with a biological mixture.

Preferably, the compostable material is transferred to a storage unit.

Preferably, the compostable material is transferred to a mixer.

Preferably, compostable material being mixed is inoculated.

Preferably, the inoculation comprises of an addition of beneficial microbiology.

Preferably, the inoculation of the beneficial microbiology is prepared from a compost tea.

Preferably, the beneficial microbiology comprises of bacteria, fungi, protozoa or a combination thereof.

Preferably, the inoculation comprises of biochar materials.

Preferably, the inoculation comprises of mineral materials.

Preferably, the compost tea is administered to the compost material.

Preferably, the compost tea is administered to a desired moisture content.

Preferably, the desired moisture content is 40% to 60% by weight.

Preferably, the compost materials are transferred to an aeration crate.

Preferably, the size of the aeration crate is 1 cubic metre in volume or other size whereby the aeration crate has a width of between 900 and 1500 mm in one dimension to allow a balance of aeration and heat retention for optimum curing of compost.

Preferably, the aeration crate is transferred to a storage area or shelving area.

Preferably, the aeration crate is transferred to a mixer if temperature of the compost material exceeds a desired temperature level.

Preferably, the aeration crate is transferred to a mixer if moisture level of the compost material is below a desired moisture level.

Preferably, temperature level, moisture level and microbiology content in the mixer is monitored until a desired level is achieved.

Preferably, the desired temperature level for cured compost is between 28° C. to 35° C.

Preferably, the desired temperature level is between 35° C. to 37° C.

Preferably, the aeration crate is a mechanized aeration crate configured with mechanized means, for example fans, tubes or like.

Preferably, the mechanized aeration crate includes heating or cooling facilities, for example temperature control elements, heat exchangers or like.

Preferably, the mechanized aeration crate includes hydration control facilities.

Preferably, the compostable material is transferred and packaged for commercial use.

Preferably, anaerobic digestion methods are used to process at least some of the compostable waste stream and methane is captured to produce heat/energy for use in the facility or for use by third parties.

Preferably, the waste management and processing system as described for collection, processing and reuse of waste material; the system including auditing of waste material generation at source; wherein separated compostable and non-compostable waste is collected in trackable bins from at least one source; data of the collected waste is reported to the at least one source from which the waste was collected.

Preferably, auditing includes recording and monitoring recyclable and non-recyclable materials used for commercial or residential purposes at a waste generating source.

Preferably, monitoring of non-recyclable materials provides data for volume estimations of landfill requirements of the waste generating source.

Preferably, recording and monitoring is facilitated by a portable digital data entry and retrieval device.

Preferably, auditing includes specifying the materials used at the waste generating source which are materials suited to processing for recycling and reuse.

Preferably, the materials suited to processing for recycling and reuse include non-organic and organic materials.

Preferably, the non-organic materials include particular specifications of plastics, paper, cardboard, glass, aluminium and other packaging materials.

Preferably, the organic materials include particular types of meats and vegetable materials, and other compostable material such as soiled paper and cardboard, and plant based polymers.

Preferably, a waste generating source is provided with waste differentiating waste collection bins; the bins including bins specific to the materials suited for reuse.

Preferably, the bins are transported between a bin storage cabinet at the waste generating source, and a waste collection vehicle without manual lifting; the bins transported on a trolley fitted with a bin supporting structure engaging a rim and/or base portion of the bins.

Preferably, the system includes waste collection vehicles; each waste collection vehicle being fitted with multiple waste separation compartments; the waste separation compartments including compartments conforming to the bins specific to the materials suited for reuse at a waste generating source.

Preferably, each waste collection vehicle is equipped for collection of both organic and non-organic waste materials.

Preferably, separate waste collection vehicles are equipped for the collection of either organic or non-organic materials.

Preferably, the system further includes at least one central processing facility; the or each central processing facility adapted to process separate streams of organic and non-organic materials.

Preferably, each central processing facility is located within an enclosed built structure.

Preferably, the system includes at least one central processing facility for the processing of organic waste material and at least one central processing facility for the processing of non-organic waste material.

Preferably, processing of the organic waste material includes milling of the organic waste material into granular form.

Preferably, the organic waste material in granular form is combined with organic matter to form a compostable organic mix and loaded into composting bins.

Preferably, food waste material is processed separately to produce an aerated biological compost.

Preferably, different types of organic material are mixed with selected soil additives to form various compost compositions suited to selected agricultural applications.

Preferably, each composting bin comprises a mesh enclosure provided with a discharge lid.

Preferably, the composting bin is further provided with forklift tine receiving structures.

Preferably, the composting bins are arranged in stacked arrays within the built structure; the bins being lifted by forklift once compost material reaches a temperature between 55 and 65 degrees centigrade; the compost material then loaded into hopper for turning by compost mixer prior to reloading into bins and returned to the stacked arrays.

Preferably, processed composted material packaged for sale and distribution to third party users.

Preferably, a central processing facility for non-organic materials includes a plastic processing section; processing of plastic materials including grading, washing, granulating, extrusion and pelletising.

Preferably, at least some processed plastic material is used to manufacture waste material collection bins and composting bins for use in the central processing facility.

Preferably, the central processing facility further includes machinery for separately processing glass, aluminium and other solid materials; processed materials packaged for sale and distribution to third party users.

According to another broad form of the invention, there is provided a method of reducing a non-recyclable component of a waste stream; the method includes the steps of providing a waste stream generating enterprise with a selection of trackable waste collection bins conforming to a selection of compostable and non-compostable waste materials generated by said enterprise, auditing the waste stream to identify recyclable and non-recyclable materials, and wherein auditing is facilitated by use of a digital data entry and data retrieval device; data recorded by the device providing input for calculating a non-recyclable material volume for the enterprise; audited data reported to the enterprise.

Preferably, the calculated non-recyclable material volume is made available for use in landfill planning and management by a waste management authority.

Preferably, monitoring of the waste stream includes identifying equivalent recyclable materials to replace at least some of the non recyclable materials.

Preferably, the system as described above includes apparatus for conveying a trackable waste bin between a waste collection source and a waste collection vehicle; the apparatus arranged to obviate manual lifting of the waste bin; the apparatus including a bin retaining structure operable on a conveying trolley and on the waste collection vehicle; wherein data of the waste is collected and the data reported to the waste collection source.

Preferably, the bin retaining structure engages with any one of two opposing sides of the waste bin.

Preferably, the bin retaining structure engages with any one of four sides of the waste bin.

Preferably, the bin retaining structure is affixed to an upright portion of the wheeled trolley.

Preferably, the bin retaining structure is affixed to a fixed vertical surface.

Preferably, the bin retaining structure is affixed to a lifting mechanism at a side of the waste collection vehicle.

Preferably, portions of an upper rim and/or base of the waste bin are adapted for engagement with an upper portion and/or base of the bin retaining structure.

Preferably, the system as described above includes apparatus for the processing of an organic waste material into an aerated biological compost; the apparatus including a composting bin provided with forklift tine receiving structures; the composting bin further including a mesh enclosure and may include a discharge lid.

Preferably, the apparatus further including a milling facility for milling organic waste into granulated form.

Preferably, the apparatus further including a stacking array for a plurality of the composting bins; composing bins may be turned by rotation using forklift once the compost reaches an ideal temperature of between 55 and 65 degrees centigrade; compost then being tipped into a hopper and turned by a compost mixer.

Preferably, the apparatus includes mechanisms for opening the discharge lids of the composting bins to discharge the aerated biological compost.

Preferably, the bins are rotated and emptied by forklift into a hopper, compost from the bins then fed into packaging for transport and distribution to third party users.

According to another broad form of the invention, there is provided a waste management and processing system for separation, collection, processing and reuse of waste organic material; the waste organic material collected in trackable bins provided to a waste generating source; data of the organic waste collected and reported to the waste generating source; and wherein the organic material is combined with organic matter to form a compostable organic mix; and loaded into compost unit: and loaded into a mixer; and loaded into composting bins; and wherein each composting bin is in the form of an aeration crate which includes a ventilated enclosure provided with a discharge aperture; and wherein different types of the organic material are inoculated with a biological mix to form various compost compositions suited to selected agricultural applications; and wherein the composting bins are arranged in stacked arrays within a built structure; the bins being lifted once compost material reaches a predetermined raised temperature, and/or predetermined moisture content; the compost material then loaded into a hopper for turning by a compost mixer prior to reloading into the bins and the bins returned to the stacked arrays.

According to another broad form of the invention there is provided a system of waste management and compost generation that comprises:

a waste collection system wherein waste is collected in separated compostable and non-compostable waste streams from at least one source in trackable bins; and wherein the trackable bins contain separated compostable and non-compostable waste streams from the at least one source;

a processing facility which receives and processes the compostable and non-compostable waste from the trackable bins;

a decontamination stage for further processing the waste from the trackable bins into sorted compostable streams and non-compostable streams;

a communication and data entry system for collecting the data from the sorting system and reporting the data to at least the one source from which the waste is collected; the data generated including a report on volume and/or weight of waste collected and details of any contamination; that is, presence of compostable waste in a non-compostable waste bin or of non-compostable waste in a compostable trackable bin;

a composting system which processes the compostable stream into compost material; and a processing system that processes or bundles a high percentage of the non-compostable stream into useful products.

Preferably, the waste collection system comprises of the collection of waste from a source to a processing facility or facilities.

Preferably, the waste collected has been separated by a Customer into compostable and non-compostable streams and placed into separate trackable bins.

Preferably, the waste in the trackable bin can be identified to individual sources.

Preferably, the data of the compostable and non-compostable streams is collected and reported to a source.

Preferably, the data collected on the quantity and type of materials placed in each trackable bin, the level of contamination within each trackable bin and other factors identified by the system is reported back to the Customer.

Preferably, the data is used to charge the Customer a differential fee.

Preferably, the data is collated to provide meta data on waste.

Preferably, some, or all of the non-compostable waste streams are decontaminated and then further processed into a recyclable and/or reuse stream.

Preferably, some, or all of the non-compostable waste streams are decontaminated and then further processed into a conversion stream.

Preferably, the recyclable stream is directed to a recycling facility.

Preferably, the conversion stream is directed to a conversion process to convert its contents to a usable material.

Preferably, the contents of the conversion stream are plastic materials which are converted to usable material such as diesel fuel or extruded plastics, molded plastics, 3D printing filaments and products, and/or a fuel.

Preferably, decontamination, sorting, compaction and data collection occur in a decontamination module—a facility which by virtue of its size and hygienic processes is able to be positioned close to the source of the waste so as to receive waste without the use of large compactor trucks.

Preferably, the decontamination, sorting, compaction and data collection occur in an decontamination module—a facility that is by virtue of its size and hygienic processes is be located within existing residential and commercial buildings so that trackable bins may be collected and returned 'by hand' or at least without the need for compactor trucks, or long distance transport; whereby the system thus operates on a decentralised model whereby the decontamination, sorting, compaction and data collection occur in the decontamination module closer to the source of the waste and decontaminated, 'clean' waste streams can be transported to larger, more distant facilities for re-use, recycling or upcycling into useful products.

Preferably, the small facility may be mobile or transportable.

Preferably, the system as described above in which an algorithm is used to determine what equipment should be located close to the Customer so as to minimise transport of unseparated, uncompacted waste streams.

Preferably, the compostable stream is further processed.

According to another broad form of the invention there is provided a method of generating compost material in a system of waste management and compost generation; the system including the provision of trackable bins for separated streams of compostable and non-compostable waste at a source of waste; the method comprises the steps of, processing trackable bins filled with compostable waste received from a source;
wherein the waste is collected in batches and transported to a processing location in said trackable bins;
and wherein data is collected and reported to the source;
and wherein the compostable stream is further processed into compost material; and the compost material is inoculated and transferred to an aeration volume for curing of compost material.

Preferably, processing of the compostable stream comprises of decontamination of non-compostable waste from the compostable stream.

Preferably, processing of the compostable stream comprises of shredding of compostable waste.

Preferably, processing of the compostable stream comprises of dewatering of compostable waste.

Preferably, a bulking agent is added into the compostable waste.

Preferably, the compostable waste is inoculated with a biological mixture.

Preferably, the compostable waste is transferred into a composting unit.

Preferably, the composting unit is an industrial composting unit.

Preferably, the composting unit comprises a composting chamber.

Preferably, the compostable material inside the composting chamber is mixed to facilitate biodegradation inside the chamber.

Preferably, the compostable material inside the composting chamber is agitated to facilitate biodegradation inside the chamber.

Preferably, temperature inside the composting chamber is adjusted to a desired level by the user.

Preferably, optimum temperature is 55° C. to 65° C., in order to achieve pasteurisation of the compostable material.

Preferably, pasteurised compostable material is inoculated with a biological mixture.

Preferably, the compostable material is transferred to a storage unit.

Preferably, the compostable material is transferred to a mixer.

Preferably, compostable material being mixed is inoculated.

Preferably, the inoculation comprises of an addition of beneficial microbiology.

Preferably, the inoculation of the beneficial microbiology is prepared from a compost tea.

Preferably, the beneficial microbiology comprises of bacteria, fungi, protozoa or a combination thereof.

Preferably, the inoculation comprises of biochar materials.

Preferably, the inoculation comprises of mineral materials.

Preferably, the compost tea is administered to the compost material.

Preferably, the compost tea is administered to a desired moisture content.

Preferably, the desired moisture content is 40% to 60% by weight.

Preferably, the compost materials are transferred to an aeration crate.

Preferably, the size of the aeration crate is 1 cubic metre in volume or other size whereby the aeration crate has a width of between 900 and 1500 mm in one dimension to allow a balance of aeration and heat retention for optimum curing of compost.

Preferably, the aeration crate is transferred to a storage area or shelving area.

Preferably, the aeration crate is transferred to a mixer if temperature of the compost material exceeds a desired temperature level.

Preferably, the aeration crate is transferred to a mixer if moisture level of the compost material is below a desired moisture level.

Preferably, temperature level, moisture level and microbiology content in the mixer is monitored until a desired level is achieved.

Preferably, the desired temperature level for cured compost is between 28° C. to 35° C.

Preferably, the desired temperature level is between 35° C. to 37° C.

Preferably, the aeration crate is a mechanized aeration crate configured with mechanized means, for example fans, tubes or like.

Preferably, the mechanized aeration crate includes heating or cooling facilities, for example temperature control elements, heat exchangers or like.

Preferably, the mechanized aeration crate includes hydration control facilities.

Preferably, the compostable material is transferred and packaged for commercial use.

Preferably, the anaerobic digestion methods are used to process at least some of the compostable waste stream and methane is captured to produce heat/energy for use in the facility or for use by third parties.

Preferably, the waste management and processing system for collection, processing and reuse of waste material; the system including auditing of waste material generation at source; wherein separated compostable and non-compostable waste is collected in trackable bins from at least one source; data of the collected waste is reported to the at least one source from which the waste was collected.

Preferably, auditing includes recording and monitoring recyclable and non-recyclable materials used for commercial or residential purposes at a waste generating source.

Preferably, monitoring of non-recyclable materials provides data for volume estimations of landfill requirements of the waste generating source.

Preferably, recording and monitoring is facilitated by a portable digital data entry and retrieval device.

Preferably, auditing includes specifying the materials used at the waste generating source which are materials suited to processing for recycling and reuse.

Preferably, the materials suited to processing for recycling and reuse include non-organic and organic materials.

Preferably, the non-organic materials include particular specifications of plastics, paper, cardboard, glass, aluminium and other packaging materials.

Preferably, the organic materials include particular types of meats and vegetable materials, and other compostable material such as soiled paper and cardboard, and plant based polymers.

Preferably, a waste generating source is provided with waste differentiating waste collection bins; the bins including bins specific to the materials suited for reuse.

Preferably, the bins are transported between a bin storage cabinet at the waste generating source, and a waste collection vehicle without manual lifting; the bins transported on a trolley fitted with a bin supporting structure engaging a rim and/or base portion of the bins.

Preferably, the system includes waste collection vehicles; each waste collection vehicle being fitted with multiple waste separation compartments; the waste separation compartments including compartments conforming to the bins specific to the materials suited for reuse at a waste generating source.

Preferably, each waste collection vehicle is equipped for collection of both organic and non-organic waste materials.

Preferably, separate waste collection vehicles are equipped for the collection of either organic or non-organic materials.

Preferably, the system further includes at least one central processing facility; the or each central processing facility adapted to process separate streams of organic and non-organic materials.

Preferably, each central processing facility is located within an enclosed built structure.

Preferably, the system includes at least one central processing facility for the processing of organic waste material and at least one central processing facility for the processing of non-organic waste material.

Preferably, processing of the organic waste material includes milling of the organic waste material into granular form.

Preferably, the organic waste material in granular form is combined with organic matter to form a compostable organic mix and loaded into composting bins.

Preferably, food waste material is processed separately to produce an aerated biological compost.

Preferably, different types of organic material are mixed with selected soil additives to form various compost compositions suited to selected agricultural applications.

Preferably, each composting bin comprises a mesh enclosure provided with a discharge lid.

Preferably, the composting bin is further provided with forklift tine receiving structures.

Preferably, the composting bins are arranged in stacked arrays within the built structure; the bins being lifted by forklift once compost material reaches a temperature between 55 and 65 degrees centigrade; the compost material then loaded into hopper for turning by compost mixer prior to reloading into bins and returned to the stacked arrays.

Preferably, processed composted material packaged for sale and distribution to third party users.

Preferably, a central processing facility for non-organic materials includes a plastic processing section; processing of plastic materials including grading, washing, granulating, extrusion and pelletising.

Preferably, at least some processed plastic material is used to manufacture waste material collection bins and composting bins for use in the central processing facility.

Preferably, the central processing facility further includes machinery for separately processing glass, aluminium and other solid materials; processed materials packaged for sale and distribution to third party users.

According to another broad form of the invention there is provided a method of reducing a non-recyclable component of a waste stream; the method includes the steps of providing a waste stream generating enterprise with a selection of trackable waste collection bins conforming to a selection of compostable and non-compostable waste materials generated by said enterprise, auditing the waste stream to identify recyclable and non-recyclable materials, and wherein auditing is facilitated by use of a digital data entry and data retrieval device; data recorded by the device providing input for calculating a non-recyclable material volume for the enterprise; audited data reported to the enterprise.

Preferably, the calculated non-recyclable material volume is made available for use in landfill planning and management by a waste management authority.

Preferably, monitoring of the waste stream includes identifying equivalent recyclable materials to replace at least some of the non recyclable materials.

Preferably, the system includes apparatus for conveying a trackable waste bin between a waste collection source and a waste collection vehicle; the apparatus arranged to obviate manual lifting of the waste bin; the apparatus including a bin retaining structure operable on a conveying trolley and on the waste collection vehicle; wherein data of the waste is collected and the data reported to the waste collection source.

Preferably, the bin retaining structure engages with any one of two opposing sides of the waste bin.

Preferably, the bin retaining structure engages with any one of four sides of the waste bin.

Preferably, the bin retaining structure is affixed to an upright portion of the wheeled trolley.

Preferably, the bin retaining structure is affixed to a fixed vertical surface.

Preferably, the bin retaining structure is affixed to a lifting mechanism at a side of the waste collection vehicle.

Preferably, portions of an upper rim and/or base of the waste bin are adapted for engagement with an upper portion and/or base of the bin retaining structure.

Preferably, the system includes apparatus for the processing of an organic waste material into an aerated biological compost; the apparatus including a composting bin provided with forklift tine receiving structures; the composting bin further including a mesh enclosure and may include a discharge lid.

Preferably, the apparatus further including a milling facility for milling organic waste into granulated form.

Preferably, the apparatus further including a stacking array for a plurality of the composting bins; composing bins may be turned by rotation using forklift once the compost reaches an ideal temperature of between 55 and 65 degrees centigrade; compost then being tipped into a hopper and turned by a compost mixer.

Preferably, the apparatus includes mechanisms for opening the discharge lids of the composting bins to discharge the aerated biological compost.

Preferably, the bins are rotated and emptied by forklift into a hopper, compost from the bins then fed into packaging for transport and distribution to third party users.

According to another broad form of the invention there is provided a waste management and processing system for separation, collection, processing and reuse of waste organic material; the waste organic material collected in trackable bins provided to a waste generating source; data of the organic waste collected and reported to the waste generating source; and wherein the organic material is combined with organic matter to form a compostable organic mix; and loaded into compost unit: and loaded into a mixer; and loaded into composting bins; and wherein each composting bin is in the form of an aeration crate which includes a ventilated enclosure provided with a discharge aperture; and wherein different types of the organic material are inoculated with a biological mix to form various compost compositions suited to selected agricultural applications; and wherein the composting bins are arranged in stacked arrays within a built structure; the bins being lifted once compost material reaches a predetermined raised temperature, and/or predetermined moisture content; the compost material then loaded into a hopper for turning by a compost mixer prior to reloading into the bins and the bins returned to the stacked arrays.

BRIEF DESCRIPTION OF DRAWINGS

Embodiments of the present invention will now be described with reference to the accompanying drawings wherein.

DESCRIPTION OF EMBODIMENTS

Figure 1:
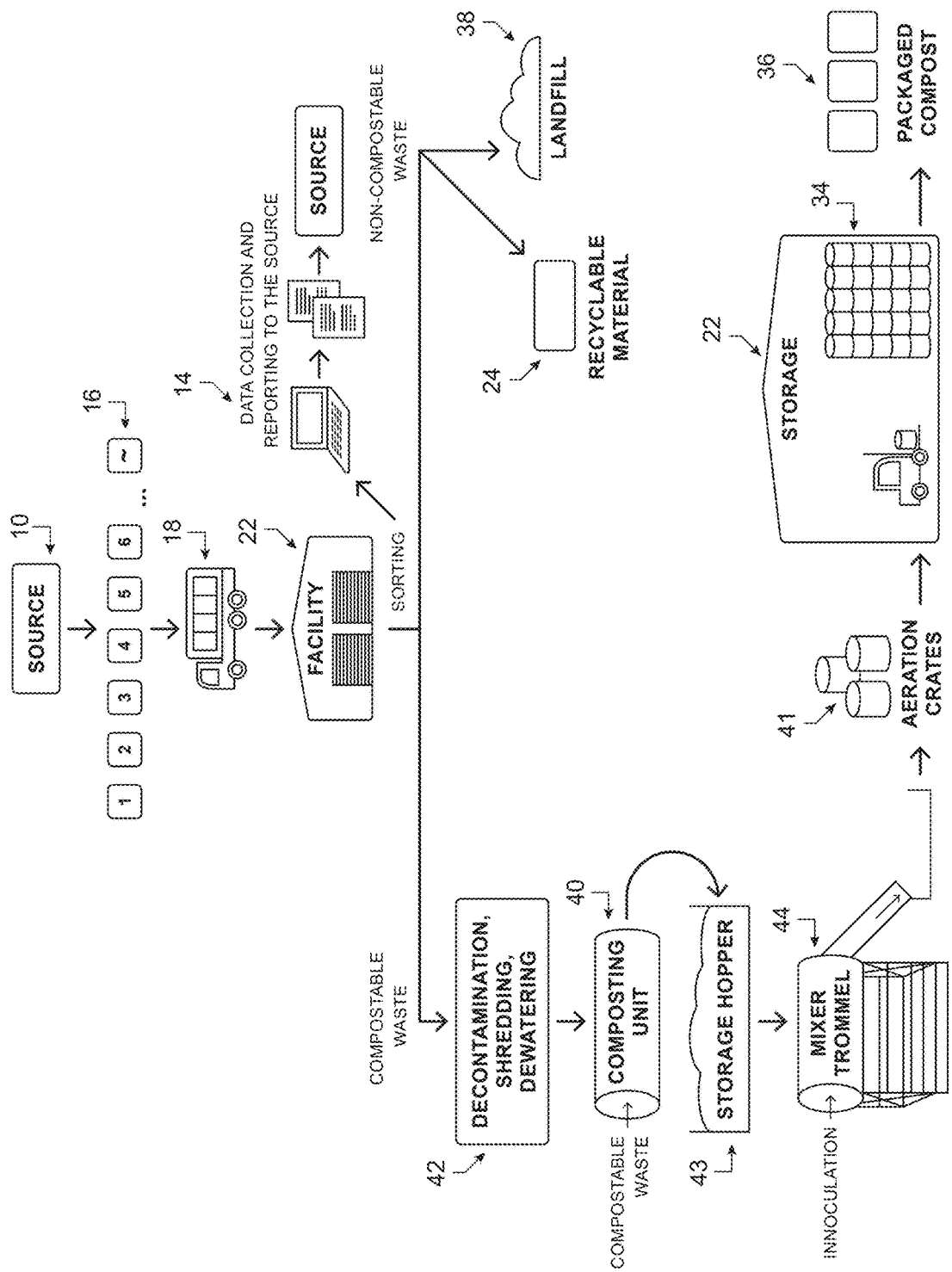
FIG. 1 is a schematic diagram of a waste management and processing system for both compostable and non-compostable waste, in particular of a compost generation system for compostable waste according to an embodiment of the invention.

Disclosed is an example embodiment of a system of waste management and processing system, in particular, of a compost generation system. FIG. 1 discloses the main components of the example embodiment. Waste is collected in separated compostable and non compostable collection bins 16 from a waste generating source 10 and transferred to a facility building 22 by a collection vehicle 18. The bins 16 are tracked so that the content of each bin can be traced back to the individual waste generating source for accurate reporting and education and billing 10. The waste is processed at the facility building 22 where data on the waste 14 such as the weight and type of waste stream collected, and the weight and type of contaminants in compostable and non compostable collection bins is recorded and reported to the waste generating source 10. The waste is then processed and sorted into a compostable stream and non-compostable stream. The non-compostable stream is then separated into individual material types for further recycling 24. The non-compostable stream can include waste such as paper, cardboard, glass, aluminium, plastics and other solid recyclable materials where they can be further processed and packaged for sale and distributed to third party users. Any non-compostable waste that cannot be further processed into recyclable material is generally transferred to a landfill site, or waste to energy facility 38. In an alternative form, any non-compostable waste that cannot be further processed into recyclable material may be converted to usable products with the end aim that the entire system produces no waste destined for landfill. One example may be conversions of certain forms of plastics into a fuel. In a further example, certain forms of plastics may be converted to diesel fuel.

Figure 4:
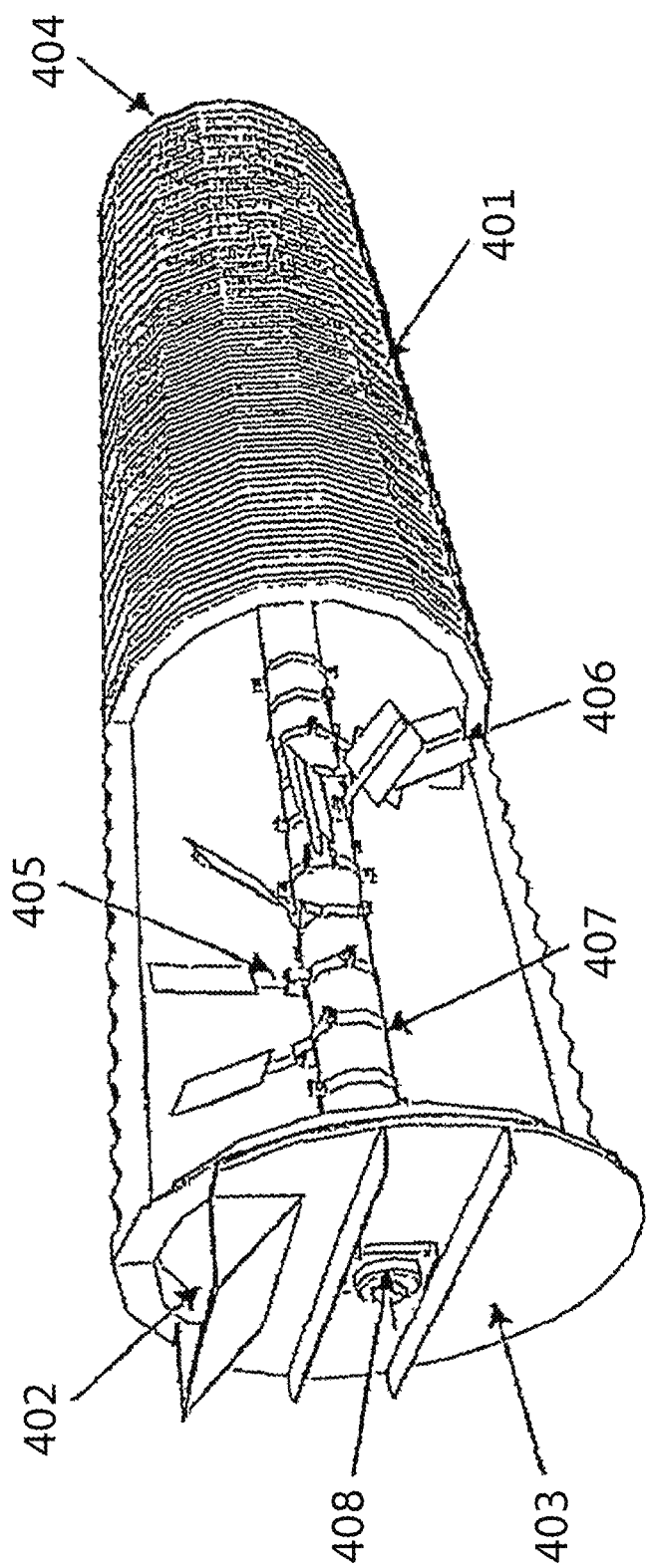
FIG. 4 is a perspective view of an existing composting unit with part of its sidewall removed to show the interior of the chamber. (this equipment is known in the art)

The compostable stream is also further processed by decontamination of non compostable material, where the contaminants are removed, identified and weighed to be reported back to the individual waste source business, or household for education, improvement and possible billing of a 'contamination levy' depending on the level of contamination in each bin. Once the compostable material has been decontaminated of non compostable material, it is shredded to reduce bulk load and placed in a dewatering system to remove excess liquid so as to control the moisture content, and temperature of the compostable waste processing method 42. A bulker can then be added with the compostable waste to achieve satisfactory aeration and create an optimum carbon and nitrogen ratio in the composting environment. Examples of bulker may include wood chip, biochar or a synthetic bulker. The compostable waste is transferred into a composting unit 40 for a period of 10 to 16 days. The compostable waste inside the composting unit 40 is mixed and agitated periodically to promote biodegradation of the compostable waste into compost material. In a preferred form, the waste inside the composting unit is rotated at least one revolution every one hour. After the revolution, the waste then remains stationery until the next cycle or revolution occurs. For example, as illustrated in FIG. 4, waste enters the composting unit via a feed chute 402 from the proximal end 403 of the composting chamber 401. The waste travels the length of the composting chamber and exits through the outlet end 404 as compost material. The composting chamber comprises of a plurality of paddles 406 each individually attached to an arm 405. Each arm 405 is affixed onto a shaft 407. The paddles 406 facilitate the movement of waste from the proximal end 403 to the outlet end 404. Air can be added into the composting unit 40 to control the oxygen levels inside the composting unit 40. Once the compostable waste has been pasteurised inside the composting unit, the material is transferred into a storage device 43. The compost material can then be transferred into a mixer. The compost material can be inoculated with beneficial microbiology inside the mixer 44. The inoculation of beneficial microbiology is prepared from a compost tea. The beneficial microbiology can be bacteria, fungi, protozoa or a combination thereof. For example, molasses (bacteria), fish hydrolyte (fungi), seaweed (fungi and bacteria) and crab shell (protozoa) can be used to promote a particular type of microbiology in the compost tea. The inoculation process continues until the desired biological activity, and moisture content is achieved. For example, the optimum moisture content is 45% to 55% by weight. Other inoculation materials may include biochar and other minerals. Once the compost material has reached its optimum moisture content, the compost material is transferred to an aeration crate 41. The aeration crate 41 is used to store and cure compost material in shelves. The aeration crate is preferably one cubic metre in volume and can be in a cube or cylindrical shape. The compost material is loaded into the top of the aeration crate 41 and is emptied from the bottom of the aeration crate 41 via a swing hatch. The main body of the aeration crate is made of ventilation screens 45 to adequately ventilate and aerate the compost. The aeration crate is transferred into a storage or shelving area for 30 to 60 days for curing. During the 'curing' process, the compost is checked regularly for temperature and moisture content. If moisture content is low, the aeration crate is transferred to a mixer. Moisture is added into the compost until a desired moisture level and microbiological content is achieved. After the compost in the aeration crate 41 is cured, the aeration crate is transferred to a mixer. Moisture is added into the compost until a desired moisture level and microbiological content is achieved. The compost is then packaged for commercial use 36.

Figure 2A:
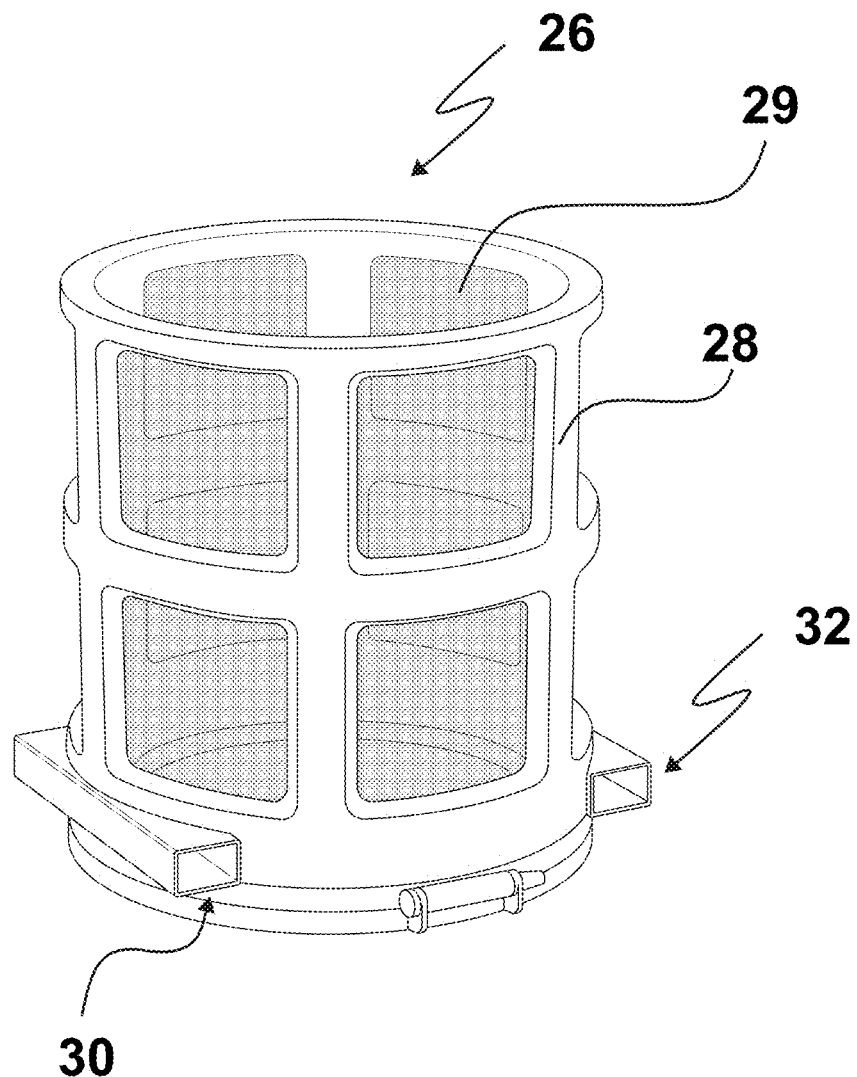
FIG. 2A is a drawing of a cylindrical shaped aeration crate.

FIG. 2A is an example embodiment of an aeration crate. FIG. 2A comprise a polymer frame 28 supporting an aerating mesh enclosure 29 and may be provided with a hinged discharge lid 30 at the base. The aeration crate 26 are further provided with forklift tine receiving structures 32 which permit the aeration crates to be readily handled and, as shown in FIG. 1, arranged in stacks 34 within the facility building 22. To add moisture, biological inoculant or turn the compost to create aeration, the compost is tipped into a hopper, conveyor and/or screw auger 43 for feeding to a compost mixer 44. Compost is then turned by the compost mixer 44, then placed back into aeration crate 41 and onto shelving and stacked 34. The aeration crate can come in different shapes and sizes. For example, an aeration crate can be shaped in a cylindrical or cubic form. The volume of the aeration crate can also come in different sizes. An aeration crate of 1 cubic metre is preferred in the present invention for easy handling by forklifts and easy storage.

Preferably, the desired temperature level for cured compost is between 28° C. to 35° C.

In an alternative embodiment, the desired temperature level in the aeration crate 26, 41 is between 35° C. to 37° C.

In yet another preferred embodiment, the aeration crate may be a mechanized aeration crate 26, 41 configured with mechanized means, for example fans, tubes or like.

Alternatively, mechanized aeration crate 26, 41 may include heating or cooling facilities, for example temperature control elements, heat exchangers or like.

Preferably, the mechanized aeration crate 26, 41 may include hydration control facilities.

Figure 2B:
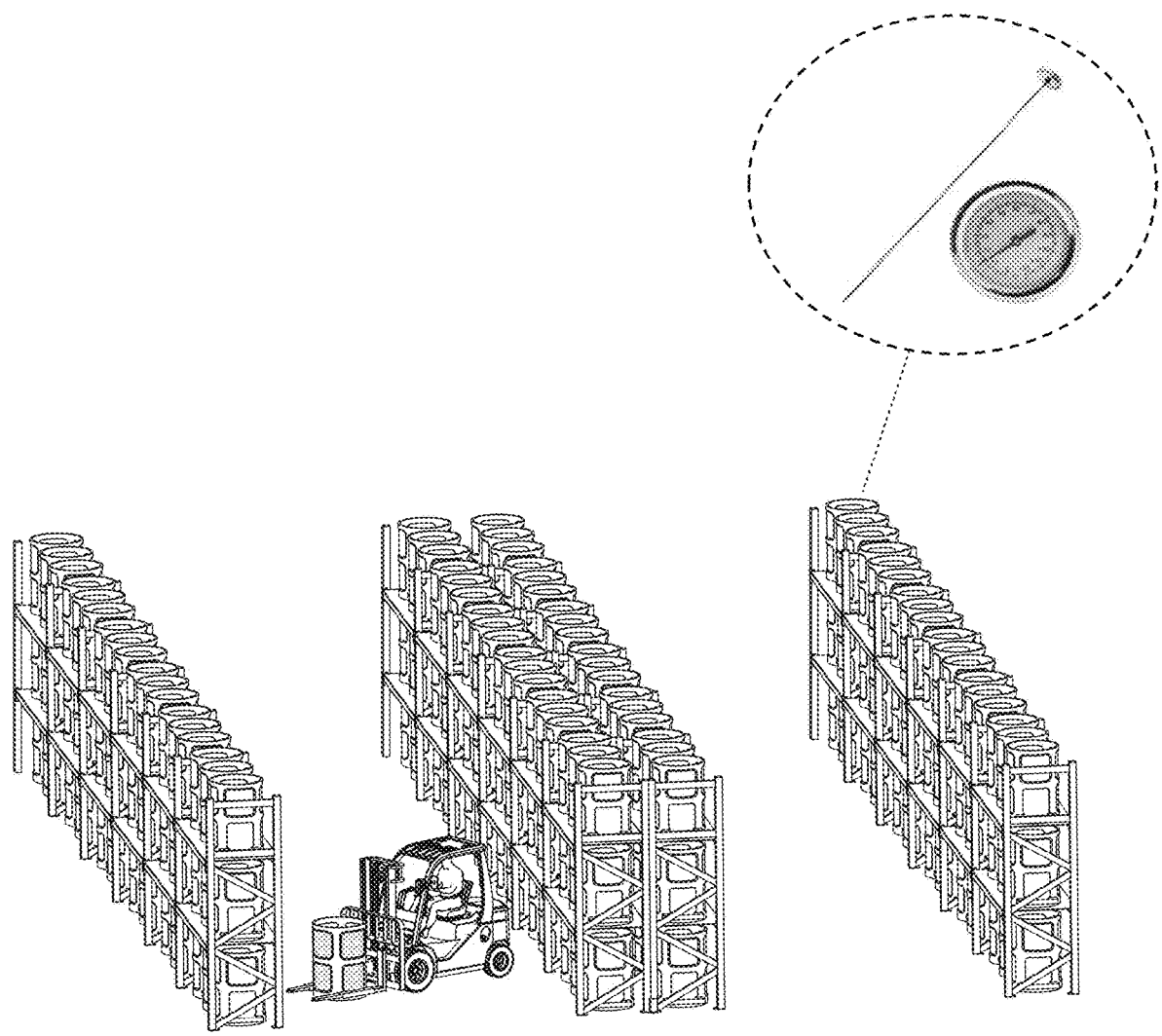
FIG. 2B is a drawing of a wall of the cylindrical shaped aeration crates of FIG. 2A.

With reference to FIG. 2B there is illustrated an aeration container in the form of a storage wall. Aeration crates are shown stacked on shelving, with shelving being as long, wide or high as needed for each facility.

Figure 3:
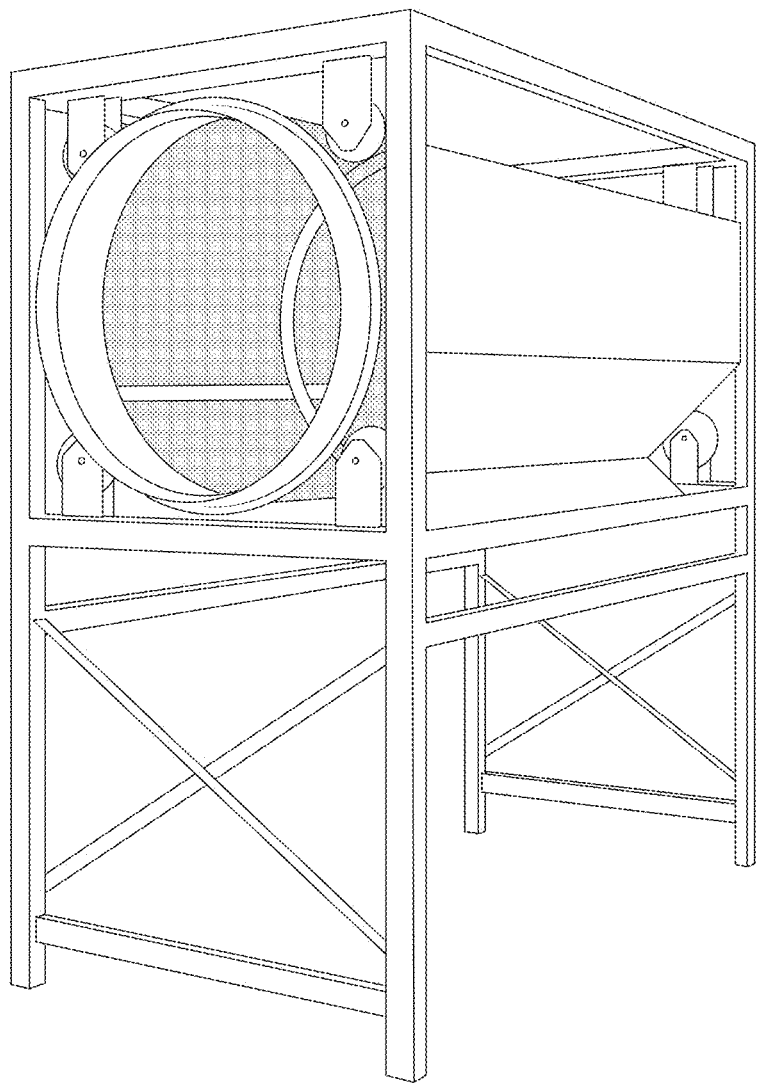
FIG. 3 is a picture of a trommel used in the invention to filter large and small particles as desired, from the compostable waste stream; (this equipment is known in the art)

FIG. 3 is an example embodiment of a trommel. A trommel is used to remove large sized aggregate material greater than 5 mm from the finished/cured compost mix.

The compost material from the composting unit is transferred into a mixer 51. The compost material can be inoculated with beneficial microbiology insider the mixer 51. For example, the beneficial microbiology may comprise of bacteria, fungi, protozoa or a combination thereof. The inoculation process continues until a desired moisture content level is achieved (e.g. 45% to 55% by weight). Once the compost material has reached its optimum moisture content, the compost material exits the mixer via a chute 52 and is transferred to an aeration crate for curing and storage.

FIG. 4 is an example embodiment of a composting unit that is used in the initial part of the composting process of the present invention. FIG. 4 is a reproduction of FIG. 1 of PCT/NZ01/00171. FIG. 4 comprises of a composting chamber 401 where waste enters the feed chute 402 at the proximal end 403 of the composting chamber 401. The waste passes from the proximal end 403 of the composting chamber and exits the composting chamber at the outlet end 404. The movement of the waste from the proximal end 403 to the outlet end 404 is facilitated by a plurality of paddles 406. Each paddle is attached to an arm 405 affixed onto a shaft 407. The composting unit comes in a variety of sizes, with different sizes of the composting unit being used in the present invention.

System of Full Recycle

Figure 5A:
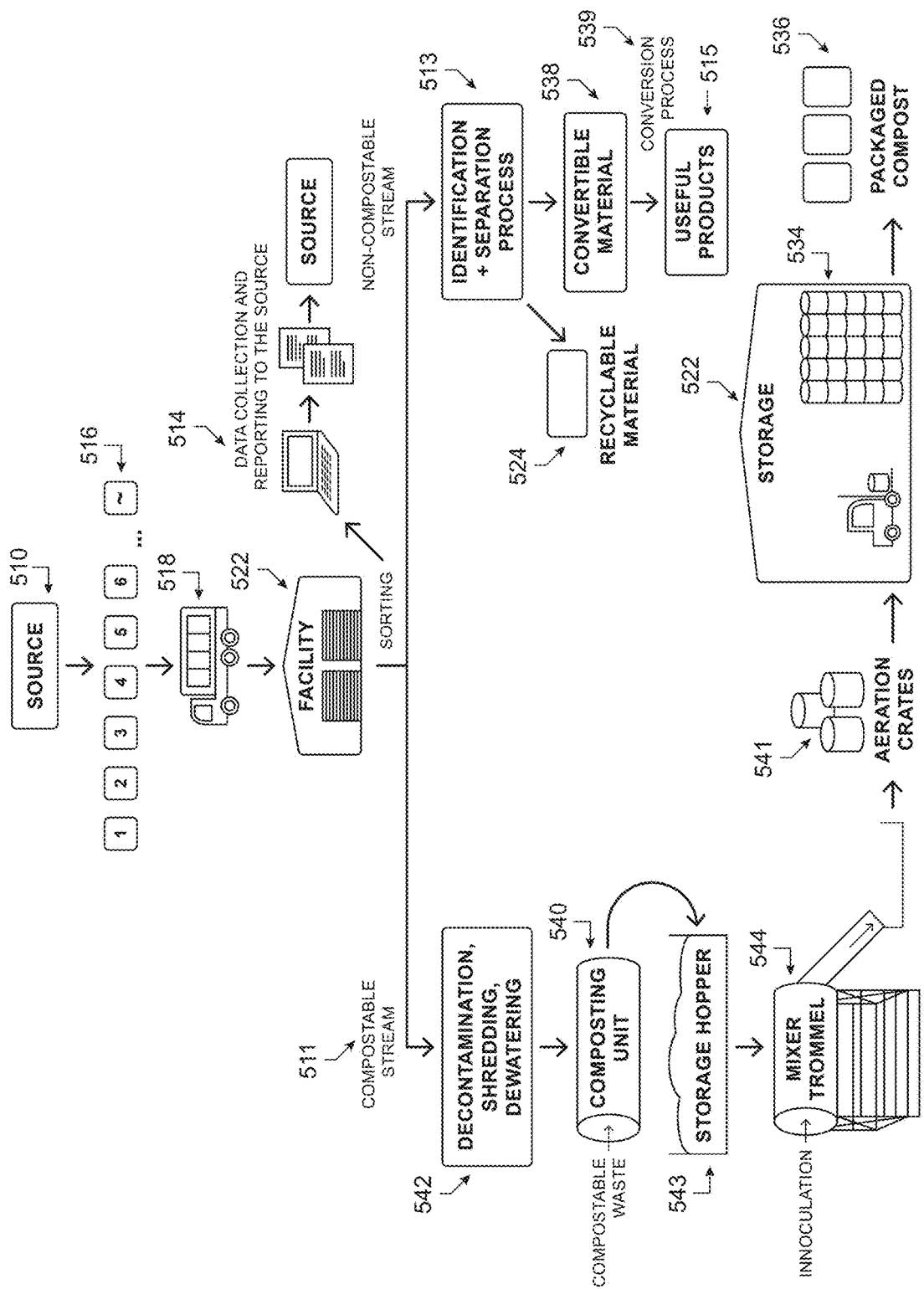
FIG. 5A is a schematic diagram of a waste management and processing system for both compostable and non compostable waste, in particular for non compostable waste according to a further embodiment of the invention.

FIG. 5A is an example embodiment of a waste management and processing system as shown in the first embodiment except like components are numbered in the 500 series. In this embodiment, the non compostable stream 512 is further processed via a separation process 513. The separation process 513 separates the recyclable materials 524 and convertible material 538. The purpose of the separation process 513 is to eliminate the need for any materials to go to a landfill. In a preferred form, the separation process 513 identifies convertible materials for conversion via the conversion process 539 to useful products 515. For example, in this process, plastic materials may be converted into diesel fuel via pyrolysis. Another example of a pyrolysis process that may be used to advantage to convert materials is one where for example cellulose based materials such as wood or cardboard are subject to pyrolysis thereby converting them to char or other granulated carbon form. Existing technologies may be used for the conversion of plastic materials into diesel fuel. An example of the exiting diesel fuel conversion technology is disclosed in U.S. Pat. No. 9,624,439B2 (Bakaya et al.).

The recyclable materials 524 may be recycled into other useful products. For example, plastic wastes may be recycled into plastic products such as aeration crates, pots, waste collection bins, building products and polyester threads. Paper and cardboard wastes may be recycled into packaging products such as takeaway containers and coffee cups. Glass wastes may be recycled into glass products such as bench tops, artworks or aggregate for earthworks or road base. Polystyrene wastes may be recycled into polystyrene products such as surfboards and picture frames. A person skilled in the art would understand that the above examples are not exhaustive and other useful products may result especially through advances in recycling technology.

Figure 5B:
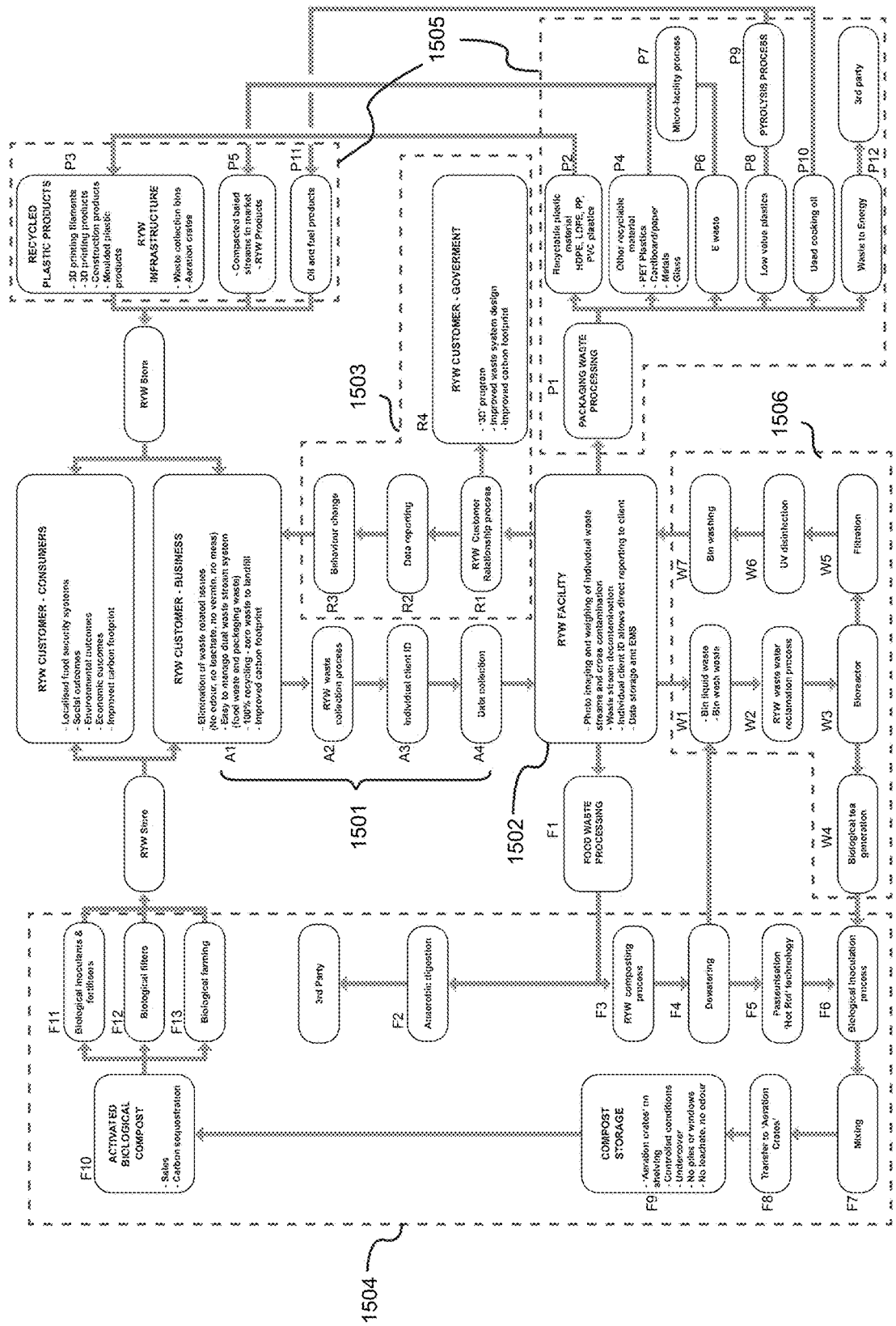
FIG. 5B is a process flow map of an alternative waste collection, separation and data processing facility, waste management and processing system for both compostable and non-compostable waste, according to a further embodiment of the invention.

FIG. 5B is a process flow map of an alternative waste collection, separation and data processing facility, waste management and processing system for both compostable and non-compostable waste, according to a further embodiment of the invention. In this embodiment, the full cycle process includes:

a waste collection system 1501;
a waste separation and data processing facility 1502;
a client reporting, education and behavioural change system 1503;
a food waste separation, processing and biological inoculation system utilising an aerobic composting system, with an anaerobic composting element creating 'bio' energy where the 'digestate' is utilised in the aerobic system 1504;
a packaging waste recycling system 1505; and
a waste water processing system 1506.

Detailed explanation of the full cycle process as shown in FIG. 5B are as follows:

| | | Waste collection system 1501: |
|---|---|---|
| Ref | Title | Description |
| A1 | RYW Customer - Business Elimination of waste related issues Easy to manage dual waste stream system (food waste and packaging waste) | The customer (source) is provided with a system which facilitates the separation of food waste (compostable waste) from all other waste streams. One bin is provided for food waste. This bin may have the following features:<br>Built for ease of transport and collection by RYW trucks<br>Sized for convenient placement under restaurant bench<br>On runners or wheels to allow easy filling<br>Sealed to reduce odour and vermin issues<br>Coated to allow ease of emptying and hygiene<br>Effective Microorganisms (EM), or other additive/agent may be applied to food waste in bins to assist with odour control, and prevent putrefacation during storage process.<br>One other bin will usually be supplied for all other waste, making RYW a simple, dual bin system. For some customers (source), additional bins may be provided to separate specific waste streams (Cardboard, bottles, plastics, glass, aluminium, polystyrene, etc)<br>Result: Food waste is separated from other waste streams No odour, no leachate, no vermin, no mess |
| A2 | RYW waste collection process | Collection of mobile waste bins from customer's (source) premises<br>Mobile waste bins taken to waste separation and data processing facility |
| A3 | Individual Client ID | Each mobile waste bin is provided with an identifier/tag, which integrates with RYW's CRM to allow data collected regarding individual bin to be provided to each individual customer (source).<br>Bin tags may use any technology, for example:<br>Bar code<br>Universal Product Code (UPC)<br>Radio frequency identification (RFID) |
| A4 | Data Collection | Mobile waste bins are transported to waste separation and data processing facility for data collection.<br>Data 'sets' associated with individual waste streams are associated with an individual source, or customer<br>Data sets may include waste stream types, waste stream weights, and waste stream volumes<br>Data sets may be sourced from individual mobile waste bins which are identified with an individual source thru an electronic tag |

-continued

| | | Waste collection system 1501: |
|---|---|---|
| Ref | Title | Description |
| | | Data sets may be reported to an individual source for education, waste stream improvement, contamination improvement, packaging ordering improvement or any other improvement in waste management for that individual source |
| | | Data sets may be reported to government, or general industry for improvement in waste management design, and or waste management policies. |
| | | Data collection method may incorporate Artificial Intelligence etc |

| | | Waste separation and data processing facility 1502: |
|---|---|---|
| Ref | Title | Description |
| C1 | RYW facilities | Standardised design |
| | | Localised facilities enable easy transporting of mobile waste bins from source (customer) |
| | | Facilities may be portable, and |
| | | Facilities may be used for large events and festivals |
| | | Facilities incorporate processing infrastructure including compaction and crushing equipment |
| | | Able to weigh individual mobile waste bins before processing to calculate overall waste production |
| | | Facilities may incorporate photo imaging and AI technology |
| | | Facilities may be made from recycled plastics |
| C1 - A | Bin lifting system | Mobile waste bins may be lifted on to a sorting/decontamination bench via mechanical bin lifting device |
| | | Bin lifting device may have ability to weigh individual bins |
| | | Bin lift system may incorporate bin wash process, with hot or cold water. |
| C1 - B | Sorting and decontamination | Sorting and decontaminating waste streams is necessary to divert waste from landfill and maintain maximum recycling rates. |
| | | The system may include one, or more waste material sorting and decontamination benches |
| | | The system may include the decontamination of food waste from non compostable waste |
| | | The system may include the decontamination of non compostable waste from food waste |
| | | Decontamination of individual waste streams may be completed by human hands |
| | | Identification of individual waste streams may be completed by optical sorting |
| | | Decontamination of individual waste streams may be completed by robotic arm |
| | | Decontamination of individual waste streams may be completed by other mechanical methods |
| | | Decontamination may be assisted by use of hot water from a hose with nozzle, fixed spray or washing tub |
| | | Sorting of individual packaging waste streams may be completed by human hands |
| | | Sorting and/or separation of individual packaging waste streams may be completed by optical sorting |
| | | Sorting and/or separation of individual packaging waste streams may be completed by robotic arm |
| | | Sorting and/or separation of individual packaging waste streams may be completed by other mechanical methods |
| | | Decontaminated food waste streams are ready for processing |
| | | Separated and decontaminated packaging waste streams are ready for processing |
| C1 - C | Photo imaging | Photo imaging of waste streams is used to prove waste stream contamination and identification |
| | | Cameras may be placed to create photo or video images within facility for the purpose of data collection |
| | | Photo images may collect data associated with waste stream contamination including individual contamination events |
| | | Photo images may collect data associated with waste stream identification |

-continued

| Waste separation and data processing facility 1502: | | |
|---|---|---|
| Ref | Title | Description |
| | | Photo images may collect data associated with waste stream weights, triggered from pre fed data associated with waste stream identification |
| | | Computer aided visual recognition/AI may be used to identify items and contamination and/or trigger camera |
| | | Photo images may collect data associated with waste stream volumes, triggered from pre fed data associated with waste stream identification |
| | | Photo images may be used for reporting to source (customer) and/or government, and/or industry |
| | | Taking photos or video imagery of individual contamination events may be triggered manually by staff on a sorting table by press button for the camera to record the contamination event. Different buttons may relate to different contamination events (eg one button for glass in a compostable stream, another for plastic in a compostable stream) |
| C1 - D | Weighing of individual waste streams | Facilities include weighing devices to weigh individual waste streams on a bin by bin basis |
| | | Individual weights may be correlated within data sets to enable quantify waste throughput of a source (customer): |
| | | Weights of individual waste streams may be measured via measuring device and reported electronically to the CRM |
| | | Measuring device may be types of scales with ability to transfer to data to another electronic source |
| | | Artificial Intelligence may be used to visually assess individual waste streams, and then correlate with existing data already established within the CRM |
| | | Individual waste stream data may be reported to customer (source) for the purpose of improving waste management processes |
| | | Individual waste stream data may be reported to government or industry for the purpose of improving waste management design |
| C1 - E | Waste stream decontamination | Individual waste streams require decontamination of cross contamination to ensure that each individual waste stream may be successfully processed into a product. |
| | | Waste stream contamination is defined as 'cross contamination' of food waste (organic or compostable waste) and non compostable waste streams |
| | | Food waste may be decontaminated of non compostable waste streams by placing material on a sorting/decontamination bench |
| | | Non compostable waste streams may be removed by human hand |
| | | Non compostable waste streams may be removed by robotic arm |
| | | Non compostable waste streams may be removed by other mechanical methods |
| | | Non compostable waste streams removed in this process may be weighed and and logged into EMS/CRM |
| | | Packaging waste streams may be decontaminated of food and other organic waste streams by placing material on a sorting/decontamination bench |
| | | Food and other organic waste streams may be removed by human hand |
| | | Food and other organic waste streams may be removed by robotic arm |
| | | Food and other organic waste streams may be removed by other mechanical methods |
| | | Food and other organic waste streams removed in this process may be weighed and logged into EMS/CRM |
| C1 - F | Individual source (customer) ID allows direct reporting to source (customer) | Mobile collection bin ID (tag, scanning device, bar code, UPC, RFID) allows direct identification with source (customer) |
| | | Reporting permits knowledge of contaminated waste streams, non-recyclable packaging reporting and education, individual waste stream weights, individual waste stream volumes. Such knowledge permits waste management process improvement |

-continued

| Waste separation and data processing facility 1502: | | |
|---|---|---|
| Ref | Title | Description |
| C1 - G | Data storage and Enterprise Management System | Data collected within the system may be stored in disk drive and/or cloud based data storage facilities<br>Data may be supported by an Enterprise Management System<br>Enterprise Management System (EMS) may be an application software package that supports business processes, information flows, reporting, and data analytics . . .<br>May also support Enterprise Resources Planning (ERP) systems, enterprise planning systems, and. customer relationship management software. |

| Client reporting, education and behavioural change system 1503: | | |
|---|---|---|
| Ref | Title | Description |
| R1 | Customer Relationship Management (CRM) system | System of managing data associated with data storage and EMS, and having the ability to communicate with a source (customer).<br>CRM system allows the system to manage business relationships and the data and information associated within the system<br>CRM may include information associated with individual source (customer) waste stream contamination<br>CRM may include information associated with individual source (customer) waste stream data<br>Individual source (customer) waste stream data may include contamination weights and volumes<br>Individual source (customer) waste stream data may include individual waste stream data weights and volumes<br>Individual source (customer) waste stream data may include Key Performance Indicators (KPI)<br>Individual source (customer) waste stream data may be 'live' via cloud based sharing<br>Individual source (customer) waste stream data may include waste management costs and charges |
| R2 | Data reporting | Method of sharing waste stream related data with source (customer) may be managed via CRM<br>Individual source (customer) waste stream data may include any information stored within the CRM<br>Method of sharing waste stream related data with government/industry may be managed via CRM<br>Method of sharing waste stream related data with source (customer) may be managed via another digital operating platform |
| R3 | Behaviour change | System enables behaviour change of management and staff at source (customer)<br>Source (customer) behavioural change may be made via recommendations for improvement via the CRM.<br>Source (customer) behavioural change may be made via display of images of waste stream contamination via the CRM<br>Source (customer) behavioural change may be made via written documentation via the CRM<br>Such written documentation may include methodology to manage individual waste streams so that individual waste streams remain uncontaminated<br>The CRM may encourage source (customer) compliance of correct waste management procedures within the system by charging less for uncontaminated individual waste streams distributed into the system<br>The CRM may encourage source (customer) compliance of correct waste management procedures within the system by charging more for contaminated individual waste streams distributed |
| R4 | Government/Industry reporting | The system may have the ability to provide local, state and federal governments with accurate waste stream data at bin by bin, individual waste source, business or household via EMS, CRM or other digital or non digital platform, for the purpose of improving waste management design<br>The system may have the ability to provide industry with accurate waste stream data at bin by bin, individual waste source, business or household via EMS, CRM or other digital or non digital platform, for the purpose of improving waste management design |

| \multicolumn{3}{c}{Food waste processing and composting system 1504:} |
| --- | --- | --- |
| Ref | Title | Description |
| F1 | Food Waste Processing | Process may operated within a separate facility from 'waste separation and data processing' facility<br>Food waste (compostable) stream may be decontaminated of non organic (non compostable) waste<br>Process may include non organic waste decontamination of organic waste<br>Non organic waste may be separated, weighed and reported, with possible extra charge<br>Process may include reporting process to customer via CRM<br>Effective Microorganisms (EM) may be used to store food waste prior to processing |
| F2 | Other technologies | May include:<br>anaerobic digestion also integrating dewatering as needed<br>production of biogas<br>food waste maceration into grease trap and other onsite waste water treatment systems<br>Effective Microorganisms (EM)<br>open air windrows<br>tunnel and batch composting<br>or any other method of processing organic waste<br>Biogas can be used to provide heat and power to our machinery and surrounding buildings, once again increasing the efficiency and/or 'closed = loop' nature of the invention. |
| F3 | Aerobic composting process | Aerobic composting process may utilise in-vessel technology<br>No odour - organic waste may be turned turned regularly within in vessel unit, windrow, or static pile to ensure aerobic atmosphere within composting environment<br>No leachate - in-vessel unit is preferably utilised to capture any excess liquid<br>Heating (pasteurising) compost to 55-65 degrees to eradicate pathogens such *E. Coli*, *Salmonella*, faecal coliforms among others<br>Compost storage (post in-vessel, windrow or static pile process) include:<br>aeration crates (RYW technology)<br>open air windrows<br>static piles |
| F4 | Dewatering | Process may include a method for removing/controlling liquid pre- pasteurisation process<br>Removing liquid allows control of moisture content throughout process<br>Dewatering process may be made via 'perforated holes' in decontamination bench/process<br>Dewatering process may be made via screw press mechanism |
| F5 | Pasteurisation via aerobic digestion | Pasteurisation process may include windrows, or static piles<br>Pasteurisation process will preferably include an aerobic digestor such as 'HotRot' or 'OSCA' technology (see both patent specs)<br>Decontaminated organic waste may be transported into aerobic digestor via screw auger<br>Decontaminated organic waste may be transported into aerobic digestor via bin and bin lift mechanism |
| F6 | Biological Inoculation | Biological inoculation may include different types of bacteria, fungi, protozoa and other beneficial microbiology suitable for healthy plant growth<br>Biological inoculation may occur pre pasteurisation process<br>Biological inoculation may occur post pasteurisation process<br>Biological inoculation may be sourced from a 'compost tea'<br>Biological inoculation may be sourced from a Effective Microorganisms<br>Biological inoculation may include liquid from compost tea generation and Effective Microorganisms of being sprayed onto organic material<br>Biological inoculation enhances biological activity reducing storage time for compost |

-continued

| Food waste processing and composting system 1504: | | |
|---|---|---|
| Ref | Title | Description |
| F7 | Compost mixing and screening | Compost may be turned in a mixing device to ensure adequate blending of material, including biological inoculants<br>Compost may be turned in a mixing device in batches<br>Compost may be screened to separate different sized particles<br>Compost may be screened using a trommel, or rotaryscreen |
| F8 | Transfer to Aeration Crates | Compost may be transferred from aerobic digestion unit into a hopper for temporary storage<br>Compost may transferred from hopper to aerated compost storage system for curing, by screw auger<br>Compost may transferred from hopper to erated compost storage system for curing by conveyor belt |
| F9 | Compost storage | Compost may be stored in windrows during curing process<br>Compost may be stored in static piles during curing process<br>Compost may be stored in aeration crates during curing process<br>Aeration crates may be of a cylindrical shape<br>Aeration crates may have mesh, or perforated lining to allow for suitable aeration of curing compost<br>Aeration crates may be lifted via forklift<br>Aeration crates may have an ability to empty material from bottom of crate<br>Aeration crates may be stacked on shelves, space efficiency<br>Aeration crates may be stored undercover allowing higher potential for control (ideal moisture content - not affected by rain or excessive sunlight)<br>Compost may be stored in windrows<br>Compost may be stored in static piles |
| F10 | Activated Biological Compost | Cured compost may be recognised as Activated Biological Compost<br>Cured compost may meet Australian and International standards<br>Cured compost may meet organic certification standards<br>Cured compost may be sold to local, national and international markets |
| F11 | Biological Inoculants and Fertilisers | Compost products may be sold as biological fertilisers to market<br>Compost products may be sold as biological inoculants to market<br>Markets may include farmers/growers who wish to transition from chemical based farming to organic based farming<br>Compost products sold to farmers/growers may help farmers transition faster due to increased inoculation of microbiology in soils |
| F12 | Biological Filters | Compost products may be sold as biological filters to market<br>Biological filters may be transportable, replaceable and exchangeable |
| F13 | Biological Farming | Compost products may be used to grow organic food for market |

| Packaging waste recycling system 1505: | | |
|---|---|---|
| Ref | Title | Description |
| P1 | Packaging waste processing | Process may be operated within a separate facility from 'food waste processing' facility<br>Process may include organic waste decontamination of packaging waste<br>Process may include reporting process to customer via CRM<br>Packaging waste streams may be separated into individual waste streams for processing<br>Food waste contamination may be separated, weighed and reported, with possible extra charge |

-continued

| | | Packaging waste recycling system 1505: |
|---|---|---|
| Ref | Title | Description |
| | | Separated packaging waste streams may be sent to a Material Recovery Facility<br>Process may include processing of individual packaging streams to be sold to market |
| P2 | Recyclable plastic material processing: PET, HDPE, LDPE, PP, PVC plastics | Recyclable plastic packaging streams may be baled together and sold to market<br>Recyclable plastic packaging streams may be separated into individual polymer types, baled and sold to market<br>Recyclable plastic packaging streams may be separated into individual polymer types and individually processed into products to be sold to market<br>Plastics processing procedures may include cleaning, shredding, granulation, extrusion and molding |
| P3 | Recycled plastic products | Plastics products sold to market may include:<br>3D printing products<br>Molded plastic products<br>Waste collection drawers<br>Waste collection bins<br>Aeration crates |
| P4 | Other Recyclable Material Cardboard/Paper Metals Glass | Other recyclable packaging material to be sold to market, or further made into products for sale to market, may include:<br>Cardboard<br>Paper<br>Non ferrous metals<br>Ferrous metals<br>Glass, including bottle washing and re-use. |
| P5 | Compacted baled streams to market | Packaging streams may be separated and baled using compaction equipment<br>Packaging streams may be separated, baled and sold to local and international markets |
| P6 | E-Waste | Electronic waste may be separated sold to local and international markets<br>Electronic waste may be separated and processed into products to be sold to market |
| P7 | Micro Facility Process | Electronic waste may be sent to a designated micro-facility for processing |
| P8 | Low Value Plastics | Low value plastics may include:<br>Contaminated plastics<br>Plastics that may not have current<br>economic value and unable to be sold to<br>market Processing of low value plastics may include:<br>Washing/cleaning<br>Shredding<br>Granulation<br>Extrusion<br>Molding<br>Pyrolysis |
| P9 | Pyrolysis Process | Plastics may be processed into fuel products utilising a pyrolysis process |
| P10 | Used Cooking Oil | Used cooking oils may be collected from customers<br>Used cooking oils may be processed into fuel products |
| P11 | Diesel and other fuel products | Fuel products may be created from low value plastics utilising a pyrolysis process<br>Fuel products may be created from used cooking oils<br>Fuel products from low value plastics and used cooking oils may be blended together<br>Fuel products from low value plastics and used cooking oils may be blended with conventional fuels |
| P12 | Waste to Energy | Any waste collected within this system that cannot be recycled may be sent to a Waste to Energy for processing |

| | | Waste water processing system 1506: |
|---|---|---|
| Ref | Title | Description |
| W1 | Bin liquid waste, bin wash waste | Liquid waste may be liquid sourced from customer via food (compostable) and packaging (non compostable) waste streams |
| W2 | RYW waste water reclamation process | Liquid waste from all waste streams may be collected from sorting/decontamination bench |

-continued

| | | Waste water processing system 1506: |
|---|---|---|
| Ref | Title | Description |
| W3 | Bioreactor | A bioreactor may refer to any manufactured or engineered device or system that supports a biologically active environment. In one case, a bioreactor is a vessel in which a chemical process is carried out which involves organisms or biochemically active substances derived from such organisms. This process can either be aerobic or anaerobic. Bioreactors are commonly cylindrical, ranging in size from litres to cubic metres, and are often made of stainless steel. |
| W4 | Biological tea generation | Treated liquid waste, post bioreactor, may flow into a vessel or 'compost tea brewer' for biological tea generation. Biological tea is an aerobic process using biologically active compost to inoculate water. Feedstock such as molasses and fish emulsion (hydrolysate) may be used to activate microbiology within the 'tea'. |
| W5 | Filtration | Treated liquid waste, post bioreactor, may flow into a filter to further remove solids |
| W6 | UV disinfection | Treated liquid waste, post filter, may flow to a UV filter to remove any pathogens, or harmful bacteria Treated liquid waste, post UV disinfection will be considered safe for human use |
| W7 | Bin Washing | Treated liquid waste, post UV disinfection may be used for bin washing at food waste and packaging waste processing stages. |

Figure 6:
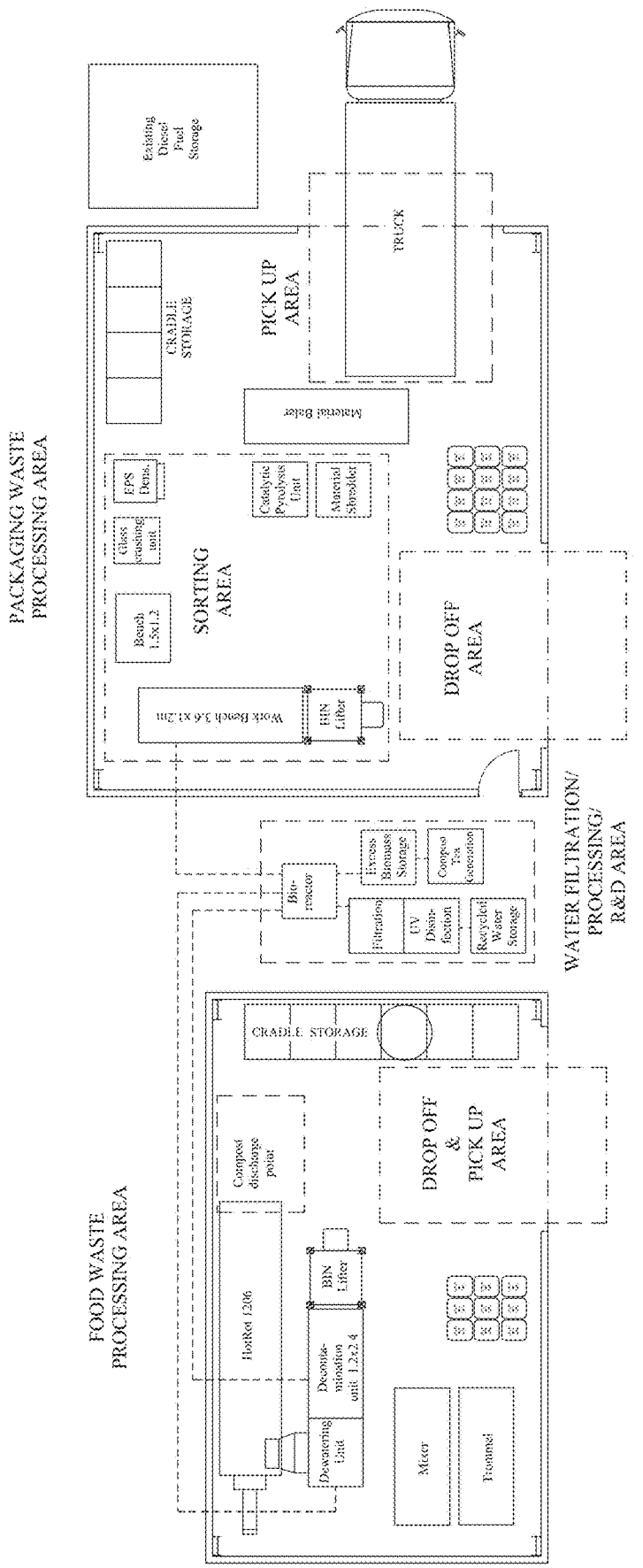
FIG. 6 is an example of a floorplan layout of equipment for implementing the systems of FIGS. 5A and 5B.

FIG. 6 is an example of a floorplan of a layout of equipment for implementing the systems of FIGS. 5A and 5B.

Wastewater Treatment Procedure Process

Packaging Waste Liquid

Packaging waste bins will be discharged to the Packaging Waste Sorting Bench to enable manual sorting based on material.

Drainage from the packaging waste, combined with the spent wash water from washing of the packaging waste bins, will drain under gravity or be pumped to a bioreactor.

This wastewater stream will be relatively dilute, with pollutants primarily comprising residual beverages from the packaging.

Food Waste Liquid

Food waste bins will be discharged to the food waste sorting bench to enable manual decontamination.

Free drainage from the food waste on the bench, combined with spent wash water from washing of the food waste bins, will drain, or be pumped to the bioreactor.

Food Waste Dewatering Liquid

The decontaminated food waste will be concentrated within a food waste dewatering unit to reduce the moisture content of the feed to any anaerobic digestion process, or the aerobic composting process.

Drainage from the dewatering unit will be directed to the bioreactor.

Bioreactor

The bioreactor may comprise a single intermediate bulk container (IBC) of approximately 1000 L capacity but may be expanded to additional multiple IBCs operating in series or larger containers depending on the pollutant loads received.

The bioreactor will be aerated intermittently (approximately 30 minutes on/30 minutes off) to cycle the unit between aerobic and anoxic conditions to facilitate treatment of the organic and nitrogen-rich pollutants.

Once per day or at other suitable intervals depending on pollutants present, aeration will be suspended to enable the biomass formed within the treatment process to settle to the base of the IBC.

Filtration/Disinfection

Once settled, the clarified effluent from in the upper levels of the IBC will be transferred through a cartridge filter and UV disinfection unit for further treatment, then stored in a dedicated recycled water storage tank.

Scum, oils and grease will be excluded from the recycled water stream by a baffle within the bioreactor.

The cartridge filters will capture residual suspended solids from the bioreactor effluent and will be manually cleaned as required.

The UV disinfection unit will provide pathogen kill to ensure the recycled water is suitable for use in bin washing.

Compost Tea Generation

Once per day, a small portion of the settled biomass may be manually drained to a separate IBC for compost tea generation. An inoculum will be added, and the IBC intermittently aerated to promote stabilisation of the biomass and generation of the product. The compost tea will be intermittently decanted for off-site use or added to the compost product generated by aerobic composting process to increase its moisture content.

Recycled Water

Sodium hypochlorite or other agent with similar effect may be introduced to the recycled water storage tank if required to maintain the quality of the water during storage. Recycled water will be drawn from the storage tank to undertake bin washing as a part of routine daily operations. Given the limited import of liquids to the site within the bins, and the export of moisture with the compost product or compost tea, it is not anticipated that substantial excess recycled water will be generated by the process. However, should this occur, excess recycled water would be transferred to an STP (sewerage treatment plant) or irrigation.

Figure 9:
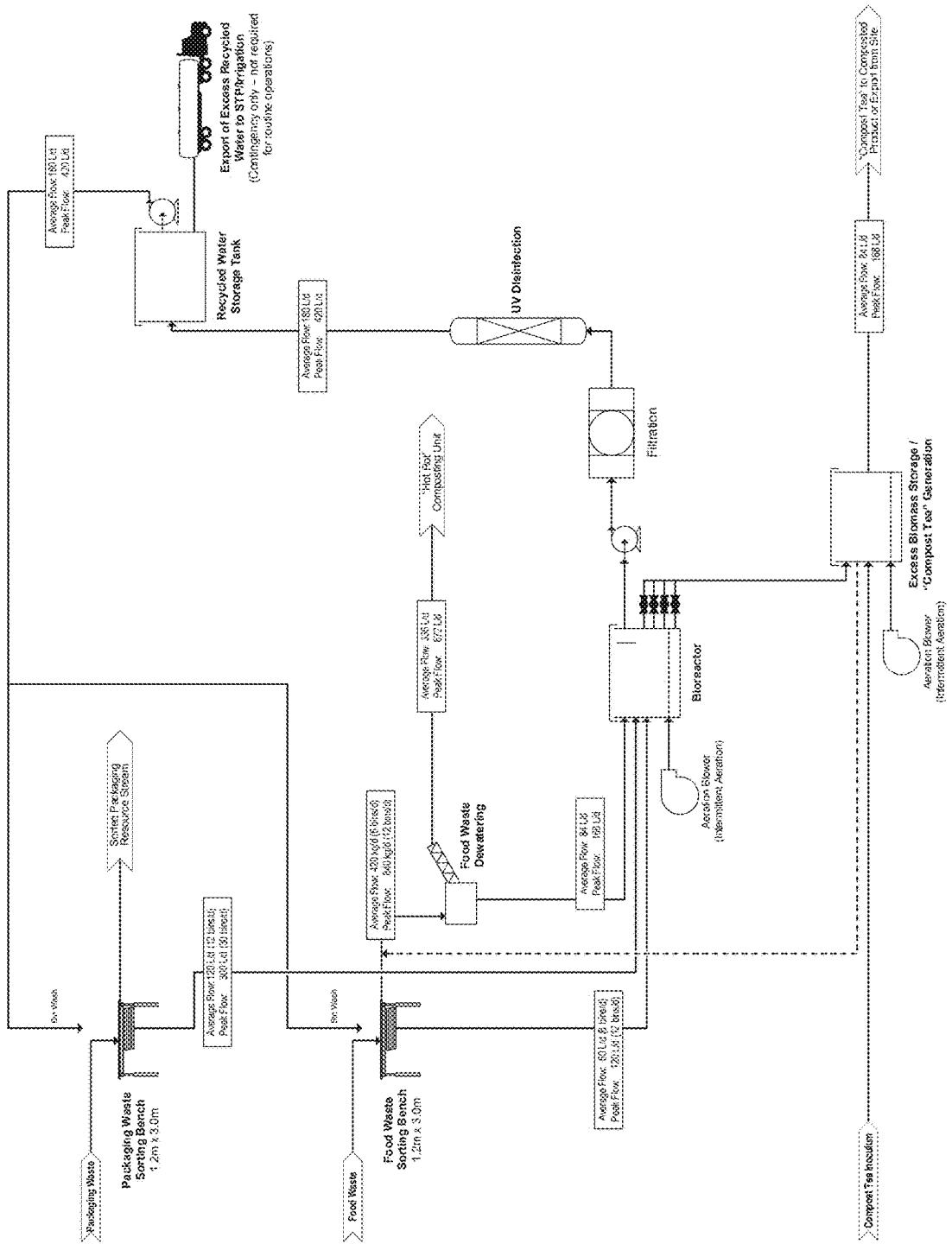
FIG. 9 is a process flow map of a waste water treatment system according yet further embodiment and usable with any of the above described embodiments.
Figure 10:
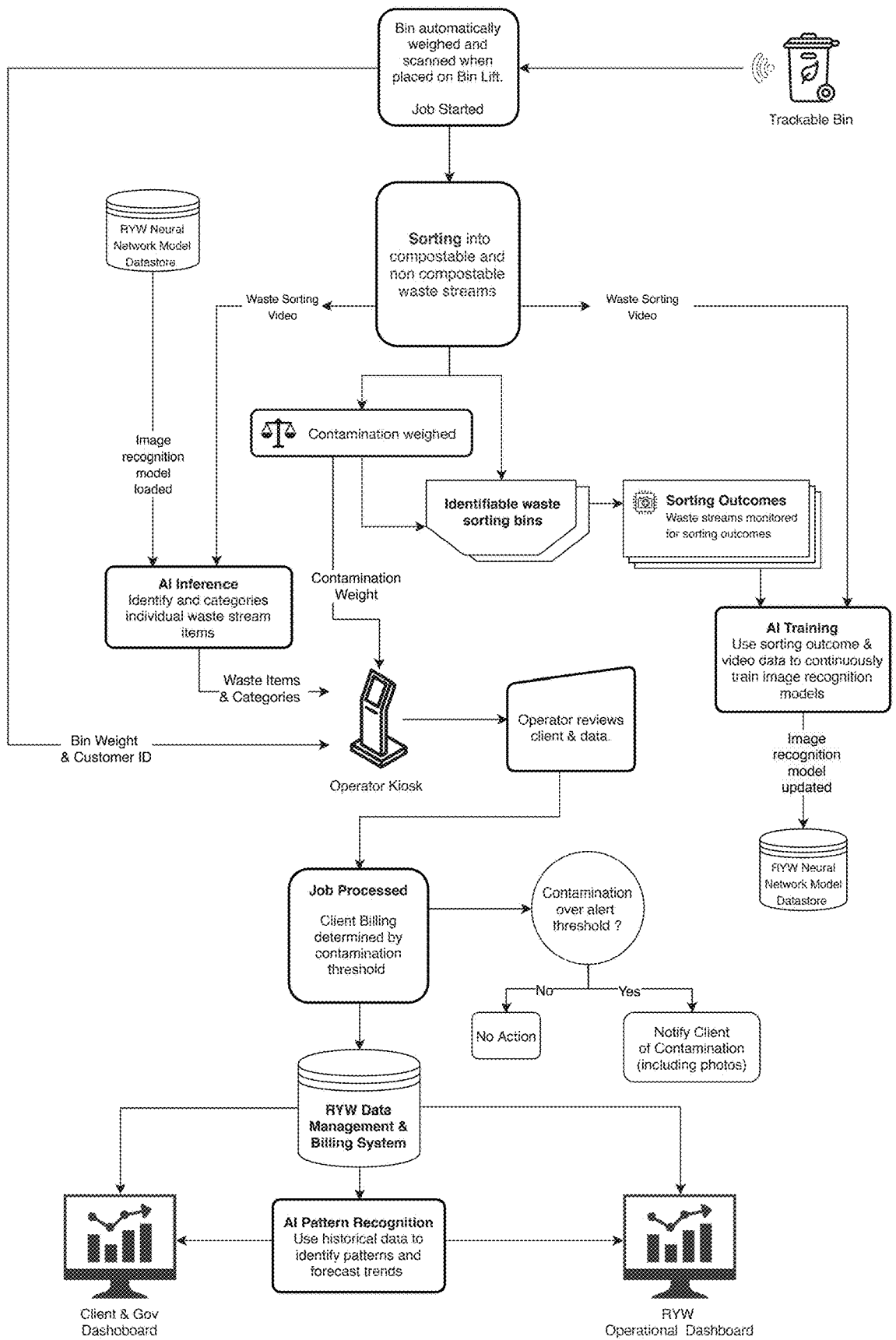
FIG. 10 is a process map of one configuration of an AI-based Data Collection, Management and Reporting System.
Figure 11:
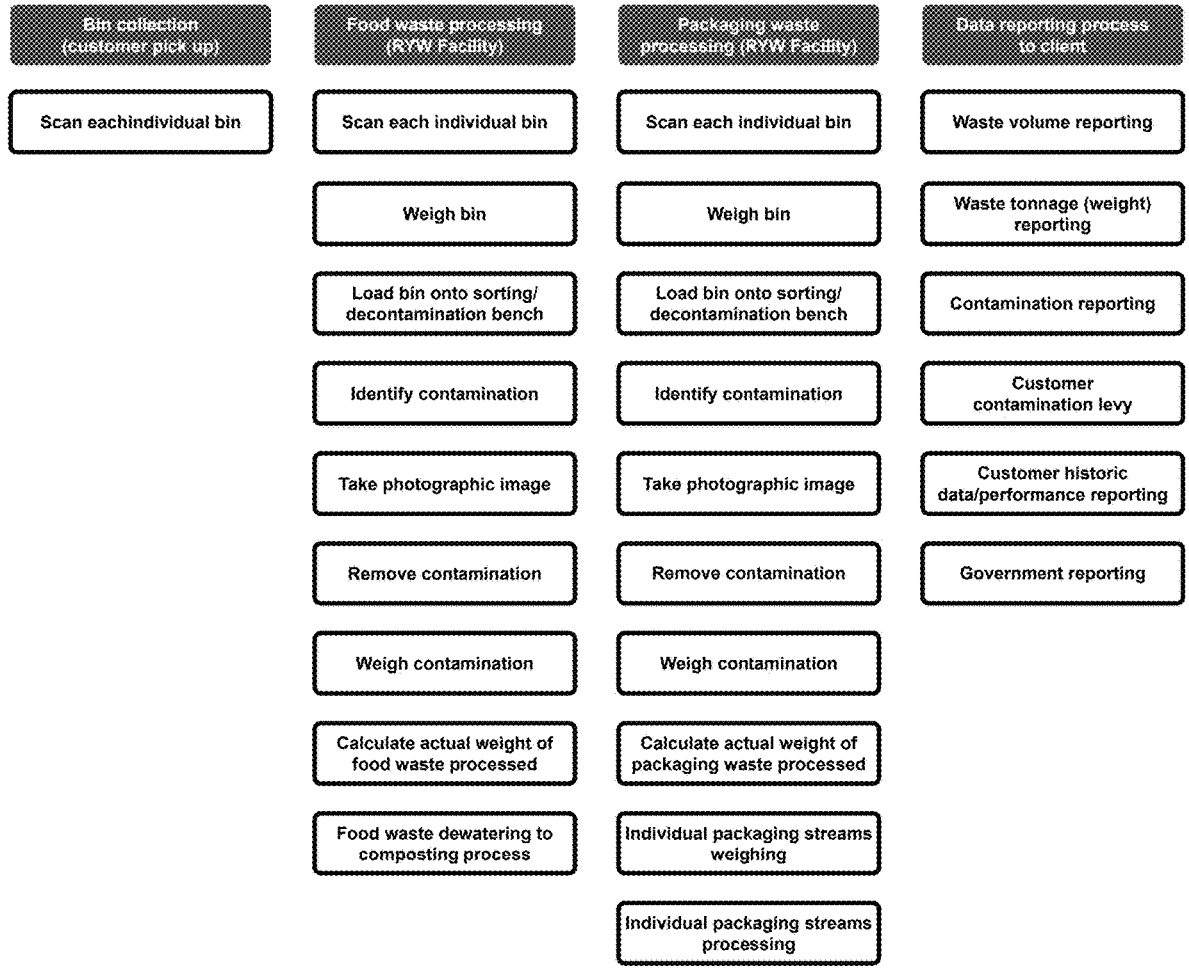
FIG. 11 is a summary flow chart of the principal features of a preferred embodiment of the invention.

A drawing of one embodiment for recycled water treatment can be found in FIG. 9.

Alternative Embodiment One

Figure 7:
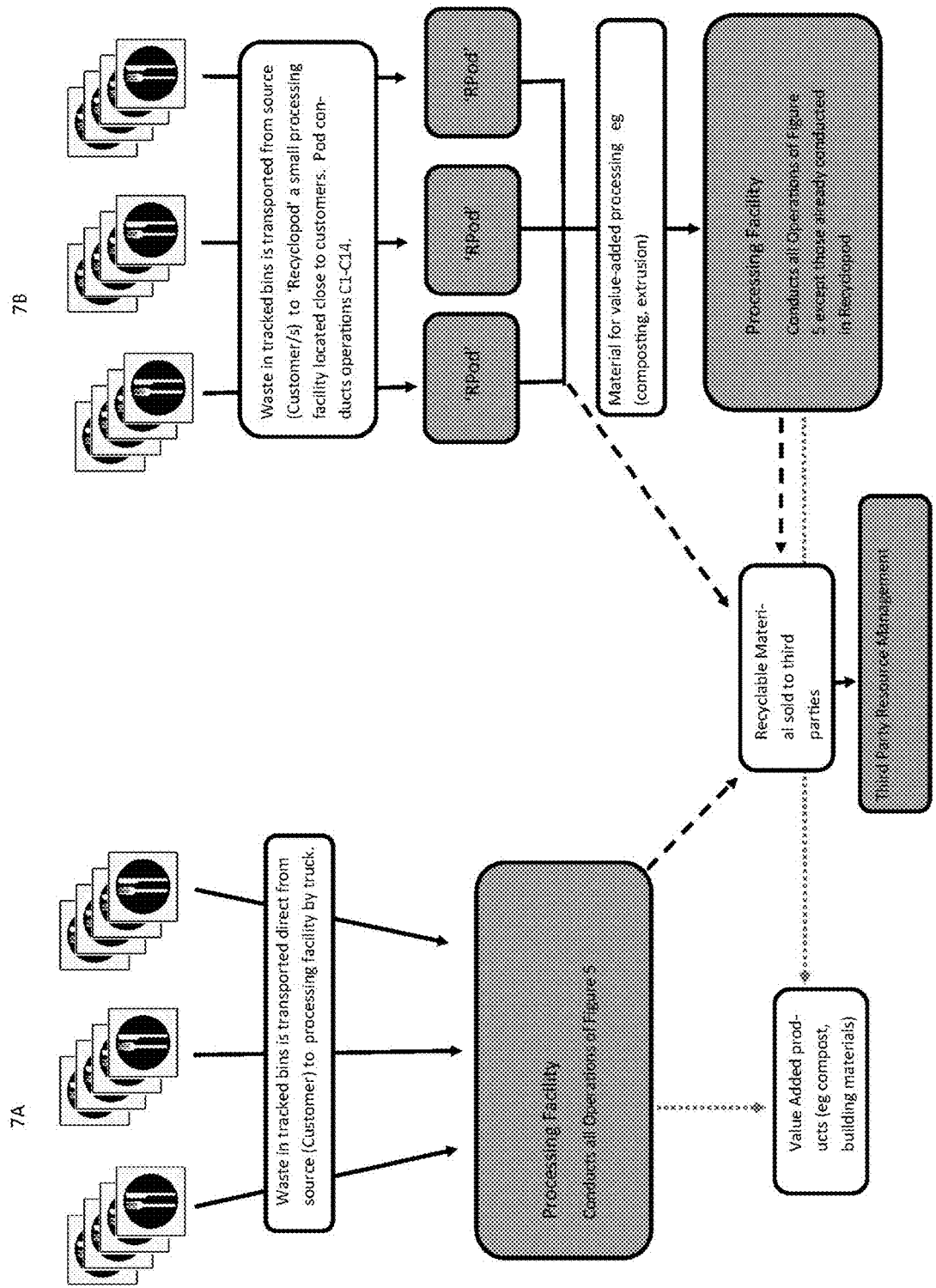
FIG. 7 is an illustration of two alternative means of conducting the operations of the System according to yet further embodiment.

FIG. 7 is an illustration of two alternative means of conducting the operations of the waste management and processing systems of FIGS. 5A and 5B.

In FIG. 7A, all the processes and equipment of the invention are housed within a Central Processing Facility (CPF). This configuration is suitable, for example, in a small regional town which produces approximately 20 T of waste a day, and where land is readily and cheaply available to build a CPF close to the town. Waste can be transported in the bins provided to customers directly to the CPF and processed.

FIG. 7B shows a configuration in which small decontamination module facilities are installed in proximity to customers or clusters of customers. The decontamination module conducts the sorting, decontamination, data collection and feedback, and some or all of the crushing/compacting and bundling operations, then sends the various waste streams, now decontaminated and in a more compact form, for sale or further processing at the CPF. This configuration is suitable, for example, in a large city in which the space or facilities to conduct recycling, processing and resource recovery are distant, and manoeuvring heavy vehicles within the city creates expense and other difficulties. In this configuration, Waste can be transported to the decontamination module by means other than heavy vehicles as described above, and heavy vehicles are only required to transport compacted, sorted waste. This configuration would also suit a remote community or facility which does not produce enough waste to justify the expense of a CFP but can benefit from sorting and compacting its waste streams.

Other configurations are possible depending on the amount and type of waste, and the cost and distance involved in transporting the various waste streams to either disposal or processing/recycling. A significant feature of this system is that facilities can have all the operations and associated equipment in one location, or parts of the system and associated equipment in different locations. The system includes an algorithm which optimises the value derived from each waste stream while limiting transport and other costs. The algorithm is based on the value of waste streams by volume pre and post sorting, compaction transport. Proximity to customers or users of the end products may also be factored in to prioritise relationships with customers and closed-loop local food growing and product manufacturing.

Figure 8A:
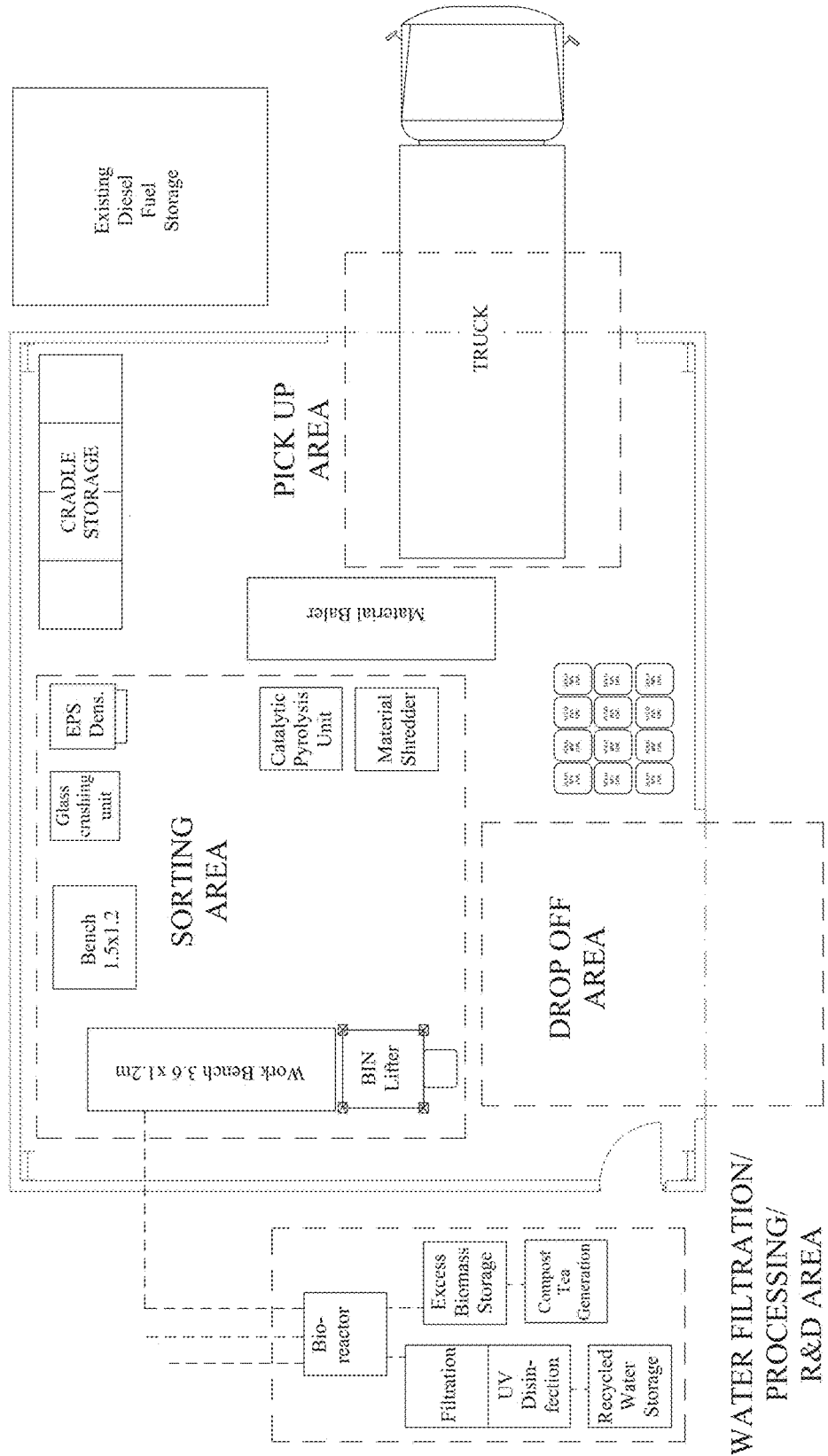
FIGS. 8a and 8b are illustrations of two possible configurations of a Decontamination Unit (aka Recylapod) according to yet further embodiment and usable with any of the above described embodiments.
Figure 8B:
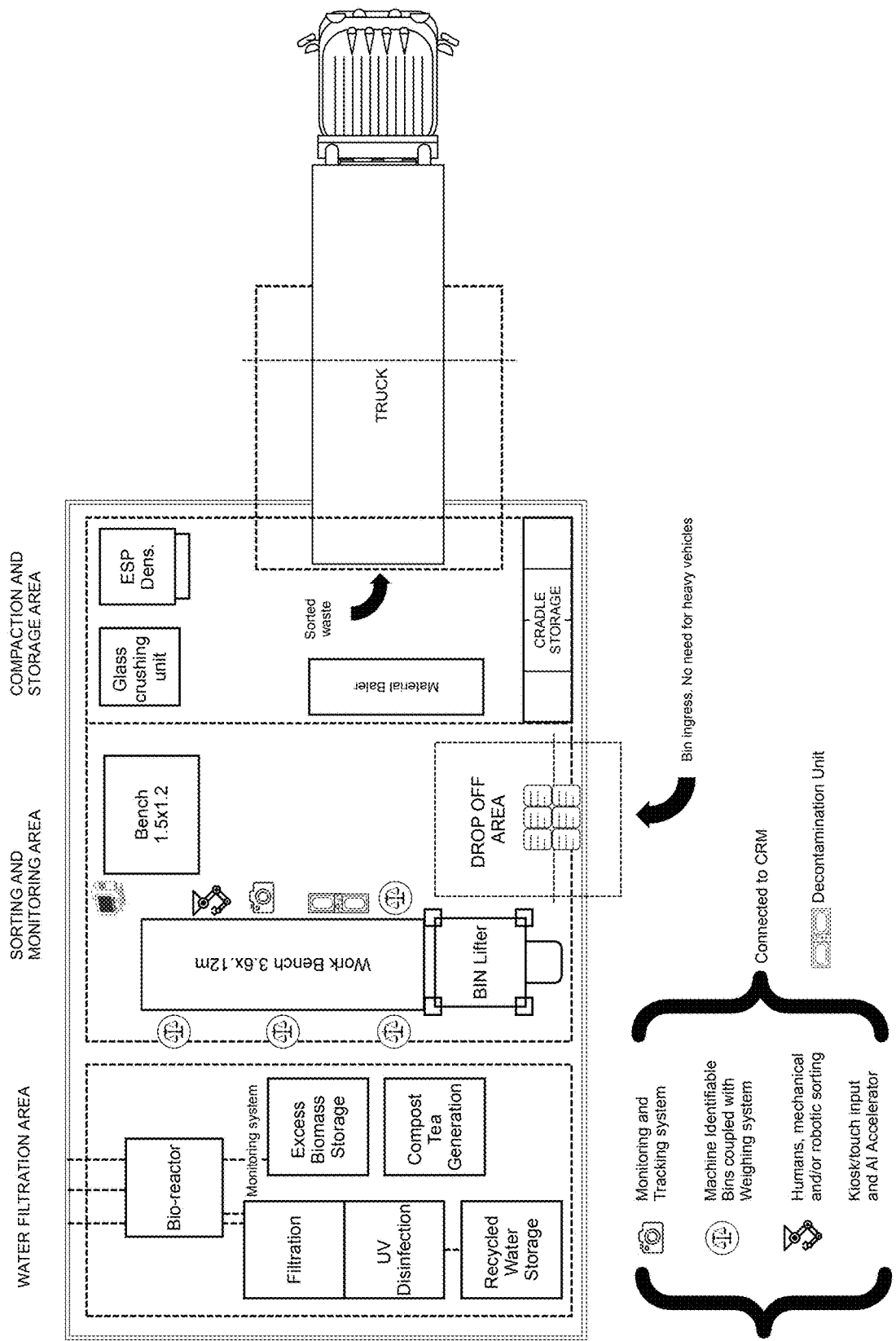

FIGS. 8a and 8b are two sample configurations of the decontamination module of FIG. 7B.

"On Site" Waste Decontamination, Separation and Bundling

One embodiment of the onsite waste decontamination, separation and bundling system is called, for sake of convenience, a decontamination module as illustrated in FIGS. 8A and 8b. A decontamination module can conduct all of the decontamination, separation, data collection and bundling operations above. It will may be built as a transportable/mobile module capable of fitting on a truck or semi-trailer. It can be built to manage the type and volume of waste generated by a specific source, and to fit into the space available in a particular location.

For example, a decontamination module can be located in the basement or service/maintenance area of a shopping centre, or building and process all of the waste from the various food businesses within it.

The advantage of a decontamination module is that uncompacted waste produced by Customers waste streams can be transported to the decontamination module within individual bins individually tagged to the customer without the use of heavy equipment such as trucks. Instead, compostable and non compostable waste streams in their uncompacted state reach the decontamination module by walking, elevators, trolleys, buggies, vans, utilities or other light commercial vehicles etc. The decontamination module decontaminates and separates the waste into various streams, which can then be effectively consolidated.

For example:
a) glass is separated from other materials in the decontamination module, then crushed and placed into containers for easy transport. This greatly reduces the volume of glass to be transported.
b) Paper and cardboard are separated from other materials in the decontamination module, then compacted and bundled for ease of transport, e.g. on pallets. This greatly reduces the volume of paper and cardboard to be transported.
c) Similarly with plastics and metals
d) Oils can be separated and placed in large containers for ease of transport The advantage of the system is that waste is separated into useful commodities and compacted BEFORE it is transported by heavy vehicle. A further advantage of this system is that waste to be transported from the decontamination module is able to be handled with a forklift and a normal truck, rather than a compactor truck. Overall, the system allows compacted waste to be transported without destroying its usefulness, and allows collection of materials directly from the decontamination module by a third party, or for transport to the composting facility without specialist equipment.

A final feature of the decontamination module is that is it small and therefore often able to be located within existing buildings, is clean, hygienic and produces no foul odours.

In Use

With reference to FIG. 1, in one form the present invention provides an efficient and convenient waste management and processing system. Waste generated from a source (such as from a restaurant, pub or hotel) are placed in trackable bins. The trackable bins are collected by a collection vehicle and transferred to a facility building. The waste is processed and sorted into two streams: compostable and non compostable waste streams. During the processing and sorting of the waste, data of the waste is collected. For example, the data may show the weight and type of the waste collected. Data may also show the types and amounts of 'cross contamination' of compostable and non compostable streams. A report may be generated and sent to the source.

The non compostable waste stream is further processed into recyclable material and non-recyclable material. The recyclable material is packaged for sale and distributed to third party users or processed into commodities of higher value. Any non-recyclable material is transferred to a landfill, waste facility or energy facility.

The compostable waste stream is also further processed by decontamination, shredding and dewatering of the compostable waste. A carbon based bulker material such as woodchip or biochar may be added to the compostable waste for aeration and a balanced level of carbon and nitrogen ratio. The compostable waste is then transferred to a composting unit to undergo decomposition and pasteurisation for a period of 10 to 16 days. This process will turn the compostable waste into compost material. Once the compost material exits from the composting unit, the compost material may be transferred to a storage device. The compost material is then transferred to a mixer where the compost material is inoculated with beneficial microbiology to increase the quality of the compost material. The types of beneficial microbiology may comprise of bacteria, fungi, protozoa or a combination thereof. The inoculation process continues until a desired moisture content level is achieved. Preferably, the desired moisture content level is 45% to 55% by weight. Once the compost material has reached its desired moisture content level, the compost material is transferred to an aeration crate for curing and storage. Preferably, the aeration crate is cylindrical and is one cubic metre in volume. This volume size is preferred for ease of transport within the facility. However, the aeration crate is not limited to any size or shape.

Curing takes place in the aeration crate where the temperature and moisture level of the compost material is regularly monitored. If the temperature is too high, the compost material inside the aeration crate is agitated (by mixing or turning the compost material) to replenish the oxygen level of the compost material. If the moisture level is too low, the compost material inside the aeration crate will be returned to the mixer so that moisture may be added to the compost material. The aeration crates may be stacked on top of each other, within a shelving system, and stored within the facility. Once the curing process ends, the composted product is tested to meet quality assurance standards such as AS4454 and EPA and other government regulations Once the appropriate standards are achieved the compost material is packaged and sold commercially to market Alternative Embodiment Two The waste management and processing system has developed around the idea of a decontamination module which is a locally situated facility which does the 'front end' waste processing prior to transporting compostable waste and some other waste streams (plastics etc.) to the Central Processing Facility for further processing, while other wastes can be bundled and collected straight from the decontamination module for sale to third parties.
Sorting, Data Collection and Reporting System The waste management and processing system begins 'in house' at the source of the waste (e.g. the restaurant, café, hotel, club, event, household etc.)

The Customer is provided with a sorting, data collection (acquisition) and reporting system which facilitates the separation of food waste from other waste streams at source. The bin features are described in more detail in FIGS. 5A and 5B.

These bins are then collected and placed on a manual sorting bench using a bin lifting device, or conveyor belt for manual, mechanized or robotic sorting.
Compostable Stream The compostable stream is checked for contamination and any non-compostable materials (e.g. packaging waste) removed and placed into the appropriate stream. Uncontaminated compostable waste, now a useful commodity, may be transported to third parties or processed further as described below.
Non-Compostable Stream The non-compostable stream is checked for contamination (e.g. food in containers) and is decontaminated (e.g. by washing contaminated containers).

Uncontaminated non-compostable materials such as plastics, glass, metals and paper/cardboard are separated into various streams for further processing and/or bundling/sale. Separation can be done by hand, robotically, or by various other methods (e.g. magnets to separate the metals, fans to separate the lighter materials).

Uncontaminated non-compostable separated waste, now a valuable commodity, is now compacted and/or bundled for ease of transport. For example, glass may be crushed, metal and paper/cardboard may be compacted and bundled. Separated waste streams may be transported to third parties or processed further as described below.
Data Collection Data is collected on the waste sourced from each individual Customer by means of weighing devices, cameras and scanners which report to a computerised system Artificial Intelligence/Machine Learning may be used to identify and sort waste and gather data on the types of waste coming from each bin/Customer The system identifies and collates information about the amount and type of waste and contamination sourced from each Customer.

The data is used for a variety of purposes including education of the individual Customer to help improve their purchasing, sorting and other processes, charging fees to the customer according to the materials removed and the contamination level, business planning, and selling 'meta data' (i.e. collated data form multiple customers) to government, commercial and other third parties.
Processing of Compostable Waste Including Removal of Pathogens and Inoculation Once the waste materials have been sorted into compostable and non-compostable waste, the compostable waste is decontaminated, shredded and dewatered in preparation of the composting process. Subsequent to decontaminating, shredding and dewatering of the compo stable waste, depending on the moisture level, bulking agent (such as wood chips or dry grass) may be added into the compostable waste to absorb excess moisture and increase air flow in the compostable waste. Preferably, the moisture content is between 40% to 50% of total mass. The aerobic composting process commences when the compostable waste is placed into the aerobic composting unit. An example of a composting unit is described in the above international application (PCT/NZ01/00171). For example, a composting unit will have a stationary composting chamber with an inlet and outlet end. The inside of the chamber may contain a series of discrete arms which can mix and agitate composting materials placed in the inlet and transport the composting materials to the outlet at the other end of the chamber. Depending on the temperature, moisture level and stage of decomposition of the compostable waste material, the composting unit may mix the composting material periodically (for example, the composting unit may churn the composting material within the chamber once per hour). After mixing, the composting material is not agitated until the next cycle of mixing. Although mixing the composting material may not be necessary, mixing the composting material may speed up the composting process and thus may provide commercial benefits to do so.

When the composting material rests inside the chamber during the aerobic composting process, heat is naturally generated as a by-product of the microbial breakdown of compostable material. The amount of heat produced depends on the size of the composting material, moisture content, aeration carbon to nitrogen ratio. Typically, the temperature inside the chamber should range between 55-65° C., which can last for 10 to 16 days depending on the volume of the composting material and composition of the ingredients. The heat produced in the aerobic composting process is essential for destroying thermosensitive pathogens, fly larvae, and weed seeds. Generally, the temperature of the composting material is kept below 65° C. to ensure beneficial microbes are not destroyed in the composting process. However, if the temperature of the composting material gets too hot, mixing or aerating the composting material will assist in dissipating the heat.

When the composting material begins to cool, agitating the composting material (such as turning or mixing) will result in a new temperature peak due to the replenished oxygen supply and the exposure of compostable matter that has not been thoroughly decomposed. However, when temperature drops and is not restored by agitating the composting mixture, the composting material enters the "curing" or maturation stage.

The curing stage occurs after the composting material is expelled from composting unit. At the curing stage, the temperature of the compost material is close to ambient temperature (for example, 25 to 35° C.) and chemical reactions continue to occur to promote the stability of the remaining compostable matter thus enabling it to be suitable for use with plants.

Generally, the composting process within the composting unit will take 10 to 16 days until the composting material is removed from the chamber and placed in a storage hopper and/or aeration crates where the curing stage takes place. Oxygen is necessary for the metabolism and respiration of aerobic microorganisms, and for oxidising compostable molecules present in the composting material. Therefore, maintaining an aerobic environment is necessary and the composting material may still require mixing in the aeration crates to maintain an optimum level of oxygen.

In order to maintain a balance level of moisture, heat and good air circulation, the size of the aeration crate may be in the range of 900 mm to 1500 mm in one dimension at least. In a particular preferred form, the width dimension is 1200 mm. In a particular preferred form, the height of the aeration crate is 1200 mm. In a preferred version, the aeration crate may be in the form of a cylinder of approximately 1200 mm diameter. In a particular preferred form, the aeration crate is approximately one cubic metre in volume. The walls of the crate may be of any material or construction which allows aeration. For example, the walls may be made of a mesh material having apertures. In the preferred form the apertures may be circular apertures of diameter in the 5-15 mm range. In most operations, the size of one cubic metre in volume is preferred for ease of transporting the aeration crates within the facility from storage racks where the aeration crates are stored in stacks and transported to a desired place by forklift trucks. In a version suitable for larger scale plants, aeration takes place in a 'wall' made of any material which allows aeration and is in the range of 900-1500 mm thick. An example of a wall is illustrated in FIG. 2B. The wall is filled with composting material from the top and has a gate or other mechanism at the bottom to allow emptying. In all versions of the aeration, the significant parameters are that the crate allows an optimal balance between aeration, temperature and moisture, and ease of filling, inoculating, monitoring, transporting, emptying and cleaning. To achieve optimum aeration, the distance between the centre of the composting material and outer boundary of the structure in which it is contained may be up to approximately 800 mm. To achieve optimal aeration, moisture and biological content thus creating the highest economic value for finished product, regular monitoring will occur, measuring temperature, moisture and biological content, preferably on a daily basis.

Probes may be inserted into the aeration crates to continually monitor the moisture, temperature and oxygen levels of the composting material. Tubes which carry warm/cold air may be added to control temperature and improve aeration. Hoses or misters may be added to control the moisture level.

Throughout the composting process, various parameters such as the carbon to nitrogen ratio, composting temperature, pH of the finished compost, moisture content and the presence of potential pathogens (e.g. coliform bacteria) are monitored to assess the quality and stability of the compost, and where the compost is outside the parameters, adjustments are made to bring the parameters into a suitable range.

Inoculation

Inoculating beneficial microbiology into composting material can speed up the growth of microorganisms in the composting material and improve the quality of the compost. In this invention, specific types of inoculants may be added into the composting material so that a particular type of compost is produced. For example, fish hydrolytes or other substances of similar effect may be added to produce fungal-dominant soils for specific types of plants (such as fruit trees) which prefer soil dominated with fungi. In another example, molasses or other substances of similar effect may be added into the composting material to produce bacteria-dominant soils suitable for specific types of plants (such as salads and certain vegetables) which prefer soil dominated with bacteria. By providing the correct type of soil to plants, it will encourage the plants to grow in the preferred condition.

Further Processing of Non-Compostable Waste Streams

Non-Compostable waste streams may be sold directly to third parties but may also be processed into higher value goods. For example, plastics may be used to produce fuel/or oil, or extruded into various forms including building materials. PET may be used to manufacture clothing. Polystyrene may be processed to produce activated carbon, or products such as surfboards, picture frames etc.

It is a feature of this invention that the above processes do not necessarily take place in one location. One of the significant challenges of waste management is that waste is a high-volume, low value product, and it is therefore uneconomic to transport. Overwhelmingly, the current solution to this is to compact waste in a compactor truck for transport. As mentioned above, once compacted, the opportunity for gathering data on the waste to an individual source, and for separating the waste streams into useful products, is lost. This invention takes a different approach to the challenge of transporting waste, which allows it to separate and process waste into useful products in small facilities which can be co-located with the source of the waste.

The above describes only some embodiments of the present invention and modifications, obvious to those skilled in the art, can be made thereto without departing from the scope of the present invention.

INDUSTRIAL APPLICABILITY

Embodiments of the present invention may be applied to transport and process waste material. In particular forms some processing may be done prior to transport. In other forms, additional processing may be done at a location separate from the initial point of pick up of the waste material. In particular forms, valuable and usable product is produced by the processing.

The invention claimed is:

1. A biological compost generation system of waste management and biological compost generation comprising:

at least one source waste collection and waste separation system wherein waste is collected from at least one source in a separated compostable waste stream and non-compostable waste stream; the waste streams collected at source in respective separate trackable compostable waste bins, and trackable non-compostable waste bins; each stream placed in the separate trackable bins at the source; and wherein the trackable bins contain source separated compostable and non-compostable waste streams from the at least one source;

a sorting and decontamination facility which receives and processes the contaminated compostable and non-compostable waste from the separate trackable compostable and non-compostable bins; and a decontamination stage at the sorting and decontamination facility for further processing the waste from the trackable bins into a sorted and decontaminated compostable stream and a sorted and decontaminated non-compostable stream; whereby compostable waste received in the trackable compostable waste bins is removed from each bin and is decontaminated at the sorting and decontamination facility; the decontamination including identifying non-compostable waste in the compostable waste from the trackable compostable waste bin and transferring the thus identified non-compostable waste to the non-compostable waste stream thereby to form a decontaminated compostable stream;

a waste water collection system in the sorting and decontamination facility which processes collected water from the decontamination of the compostable or non-compostable streams into fractions, one fraction being used as a media fraction for the growth of biological inoculant;

a communication and data entry system for collecting data from the decontamination stage and reporting the data to the at least one source from which the waste is collected; the data generated including a report on volume and/or weight of waste collected and details of any contamination; that is, presence of compostable waste in a non-compostable waste bin or of non-compostable waste in a compostable waste bin;

a bulk transportation step from the sorting and decontamination facility to a central processing facility located remotely from the at least one source; wherein the decontaminated and consolidated non-compostable stream is further processed into useable products; and wherein the decontaminated compostable waste stream is transported to a biological composting system which processes the compostable stream into biological compost, the processing of biological compost including:

a pasteurisation stage whereby the compostable material is pasteurised in an industrial composting unit where the temperature is adjusted to an optimal temperature to achieve pasteurisation, commonly in the range of 55-65 degrees Celsius thereby to produce pasteurised compostable material;

an inoculation stage whereby the pasteurised compostable material is inoculated by the addition of beneficial microbiology including a biological inoculant, thereby to produce an inoculated compostable material;

a curing stage wherein the inoculated compostable material is cured in batches in stackable aeration crates wherein temperature level, moisture content and microbiology content of the inoculated compostable material is monitored until a desired level is achieved thereby to produce the biological compost.

2. The system of claim 1 wherein the waste in the trackable bins can be identified to said at least one source from which the waste originates.

3. The system of claim 1 wherein the data of the compostable and non-compostable streams is collected and reported to said at least one source.

4. The system of claim 1 wherein the data collected on the quantity and type of materials placed in each trackable bin, the level of contamination within each trackable bin and other factors identified by the system is reported back to the at least one source.

5. The system of claim 4 wherein the data is used to charge the at least one source a differential fee.

6. The system of claim 4 wherein the data is collated to provide meta data on the waste.

7. The system of claim 1 wherein the non-compostable waste streams comprise multiple waste streams which are decontaminated and then further processed into a recyclable and/or reuse stream.

8. The system of claim 7 wherein some, or all of the non-compostable waste streams are decontaminated and then further processed into a conversion stream.

9. The system of claim 8 wherein the recyclable stream is directed to a recycling facility.

10. The system of claim 9 wherein the conversion stream is directed to a conversion process to convert its contents to a usable material.

11. The system of claim 9 wherein the contents of the conversion stream are plastic materials which are converted to usable material such as extruded plastics, molded plastics, 3D printing filaments and products, and/or a fuel.

12. The system of claim 1 wherein the decontamination stage is implemented as a decontamination module, wherein decontamination, sorting, consolidation, compaction and data collection occur in said decontamination module; said decontamination module constituting a facility which by virtue of its size and hygienic processes is able to be positioned closer to said at least one source of the waste than the central processing facility thereby receiving the waste without the use of compactor trucks.

13. The system of claim 12 wherein the decontamination module is located within existing residential and commercial buildings so that the trackable bins may be collected and returned 'by hand', or at least without the need for compactor trucks.

14. The system of claim 12 wherein the decontamination module may be mobile or transportable.

15. The system of claim 12 whereby the actions in the decontamination module are conducted manually, mechanically, robotically or a mixture thereof.

16. The system of claim 1 in which an algorithm is used to determine location of equipment relative to the at least one source so as to minimize transport of unseparated, uncompacted waste streams.

17. A method of generation of biological compost; the method comprising the following steps:

an at source collection and separation step wherein waste is collected from at least one source in a separated compostable waste stream and non-compostable waste stream; the waste streams collected at source in respective separate trackable compostable waste bins and trackable non-compostable waste bins; each stream placed in the separate trackable bins at the source; and wherein the trackable bins contain source separated compostable and non-compostable waste streams from the at least one source;

a sorting and decontamination step which receives and processes the contaminated compostable and non-compostable waste from the separate trackable compostable and non-compostable bins; and a decontamination stage at the sorting and decontamination facility for further processing the waste from the trackable bins into a sorted decontaminated compostable stream and a separated non-compostable stream; whereby compostable waste received in the trackable compostable waste bins is removed from each bin and is decontaminated at the sorting and decontamination facility; the decontamination including identifying non-compostable waste in the compostable waste from the trackable compostable waste bin, and transferring the thus identified non-compostable waste to the non-compostable waste stream thereby to form a decontaminated compostable stream;

a waste water collection step in the sorting and decontamination facility which processes collected water from the decontamination of the compostable or non-compostable streams into fractions, one fraction being used as a media fraction for the growth of a biological inoculant;

a communication and data entry step for collecting data from the decontamination stage and reporting the data to the at least one source from which the waste is collected; the data generated including a report on volume and/or weight of waste collected and details of any contamination; that is, presence of compostable waste in a non-compostable waste bin, or of non-compostable waste in a compostable waste bin;

a bulk transportation step from sorting and decontamination facility to a central processing facility located remotely from the at least one source; wherein the decontaminated and consolidated non-compostable stream is further processed into useable products; and wherein the decontaminated compostable waste stream is transported to a biological composting system located remotely from the at least one source which processes the compostable stream into biological compost, the processing of biological compost including the following steps:

a pasteurisation stage whereby the compostable material is pasteurised in an industrial composting unit where the temperature is adjusted to an optimal temperature to achieve pasteurisation, commonly in the range of 55-65 degrees Celsius thereby to produce pasteurised compostable material;

an inoculation stage whereby the pasteurised compostable material is inoculated by the addition of beneficial microbiology including a biological inoculant thereby to produce an inoculated compostable material;

a curing stage wherein the inoculated compostable material is cured in batches in stackable aeration crates wherein temperature level, moisture content and microbiology content of the inoculated compostable material is monitored until a desired level is achieved thereby to produce the biological compost.

* * * * *